(12) United States Patent
Weng et al.

(10) Patent No.: US 11,975,837 B2
(45) Date of Patent: May 7, 2024

(54) VEHICLE REGION WITH LUGGAGE COMPARTMENT AND CEILING PANEL ABOVE THE LUGGAGE COMPARTMENT, AND METHOD FOR ASSEMBLING AND DISASSEMBLING A CEILING PANEL ABOVE A LUGGAGE COMPARTMENT

(71) Applicant: Airbus Operations GmbH, Hamburg (DE)

(72) Inventors: Alexander Weng, Hamburg (DE); Felix Helfrich, Hamburg (DE); Holger Warner, Hamburg (DE); Benedikt Kircher, Hamburg (DE); Johanna Roestel, Hamburg (DE); Efe Kolcak, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/619,201

(22) PCT Filed: Mar. 26, 2021

(86) PCT No.: PCT/EP2021/057945
§ 371 (c)(1),
(2) Date: Dec. 14, 2021

(87) PCT Pub. No.: WO2021/198073
PCT Pub. Date: Oct. 7, 2021

(65) Prior Publication Data
US 2023/0025168 A1 Jan. 26, 2023

(30) Foreign Application Priority Data
Apr. 2, 2020 (DE) .................... 10 2020 109 169.9

(51) Int. Cl.
*B64D 11/00* (2006.01)
*B64F 5/00* (2017.01)

(52) U.S. Cl.
CPC ............. *B64D 11/003* (2013.01); *B64F 5/00* (2013.01)

(58) Field of Classification Search
CPC ............................. B64C 1/066; B64D 11/003
See application file for complete search history.

(56) References Cited

U.S. PATENT DOCUMENTS

| 4,490,883 A | 1/1985 | Gauron |
| 5,108,048 A * | 4/1992 | Chang .................. B64D 11/003 244/118.1 |

(Continued)

FOREIGN PATENT DOCUMENTS

| DE | 20016392 U1 | 6/2001 |
| DE | 60304668 T2 | 4/2007 |

(Continued)

OTHER PUBLICATIONS

International Search Report; priority document.
German Search Report; priority document.

*Primary Examiner* — Philip J Bonzell
*Assistant Examiner* — Michael B. Kreiner
(74) *Attorney, Agent, or Firm* — Greer, Burns & Crain, Ltd.

(57) ABSTRACT

A vehicle region with a roof section of a primary structure and with two luggage compartments. One of the luggage compartments comprises a detachable luggage compartment flap and a luggage compartment top, which forms the upper boundary of a part of a luggage space. A detachable fastening device can rotatably fasten the luggage compartment flap on the luggage compartment. A front edge of the luggage compartment top is at a distance from an end point in an intermediate space above a luggage compartment, to which (Continued)

end point a side of a ceiling panel is movable, the distance being greater than or equal to a width of the ceiling panel. Methods for installing and removing a ceiling panel above two luggage compartments are provided, wherein the ceiling panel is guided at least partially through a luggage space of a luggage compartment when the luggage compartment flap has been removed.

16 Claims, 13 Drawing Sheets

(56) References Cited

U.S. PATENT DOCUMENTS

| | | | | |
|---|---|---|---|---|
| 5,129,597 | A * | 7/1992 | Manthey | B60Q 3/43 244/119 |
| 5,395,074 | A * | 3/1995 | Hart | B64D 11/003 244/119 |
| 6,290,175 | B1 * | 9/2001 | Hart | B64D 11/003 244/118.1 |
| 6,398,163 | B1 * | 6/2002 | Welch | B64D 11/003 244/118.1 |
| 8,038,098 | B2 * | 10/2011 | Johnson | B64D 11/003 244/118.1 |
| 8,672,266 | B2 | 3/2014 | Ehlers et al. | |
| 8,814,093 | B2 * | 8/2014 | Wuggetzer | B64C 1/066 244/129.1 |
| 10,077,111 | B2 * | 9/2018 | Papke | E05D 5/04 |
| 10,737,789 | B2 * | 8/2020 | Jung | B64D 11/003 |
| 2011/0024058 | A1 | 2/2011 | Kernmayer et al. | |
| 2017/0283058 | A1 * | 10/2017 | Papke | E05D 5/04 |

FOREIGN PATENT DOCUMENTS

| | | |
|---|---|---|
| DE | 102008006949 A1 | 8/2009 |
| EP | 1900573 A1 | 3/2008 |

* cited by examiner

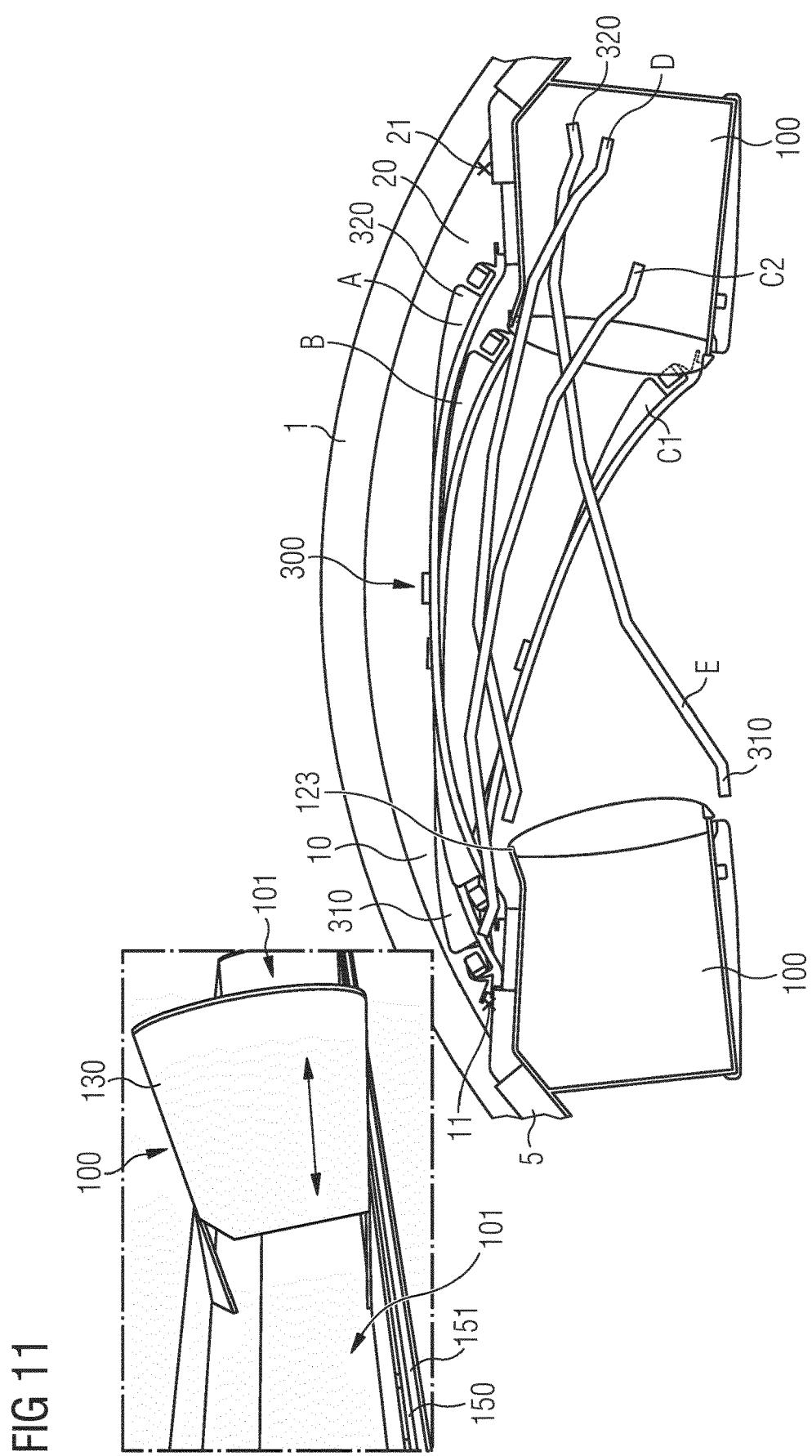

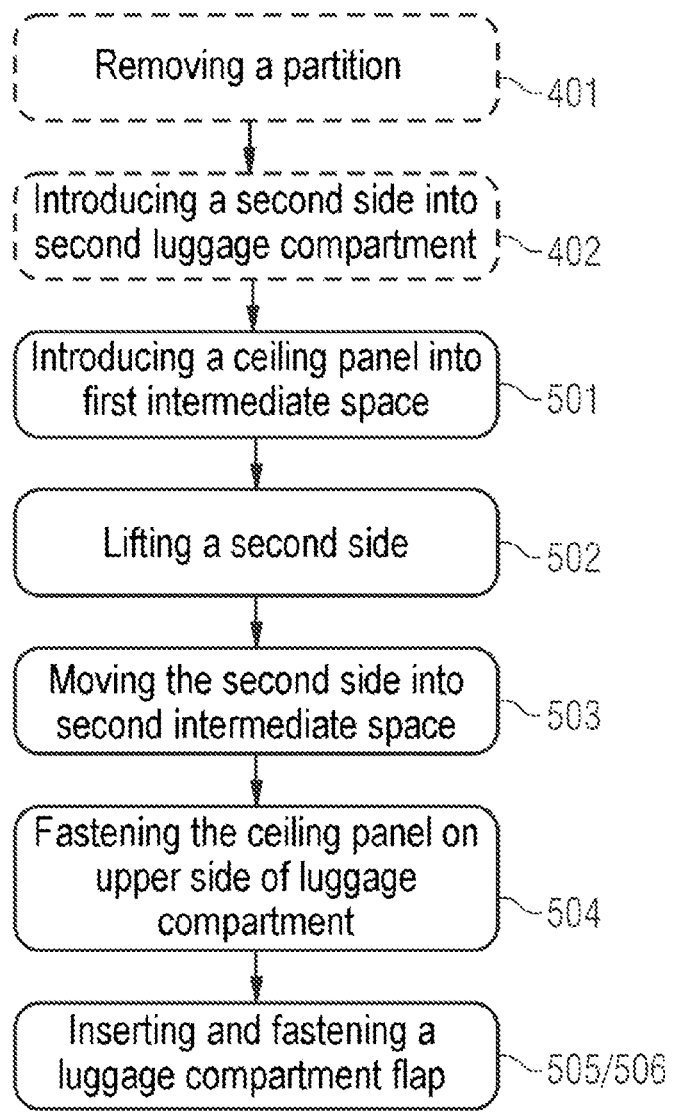

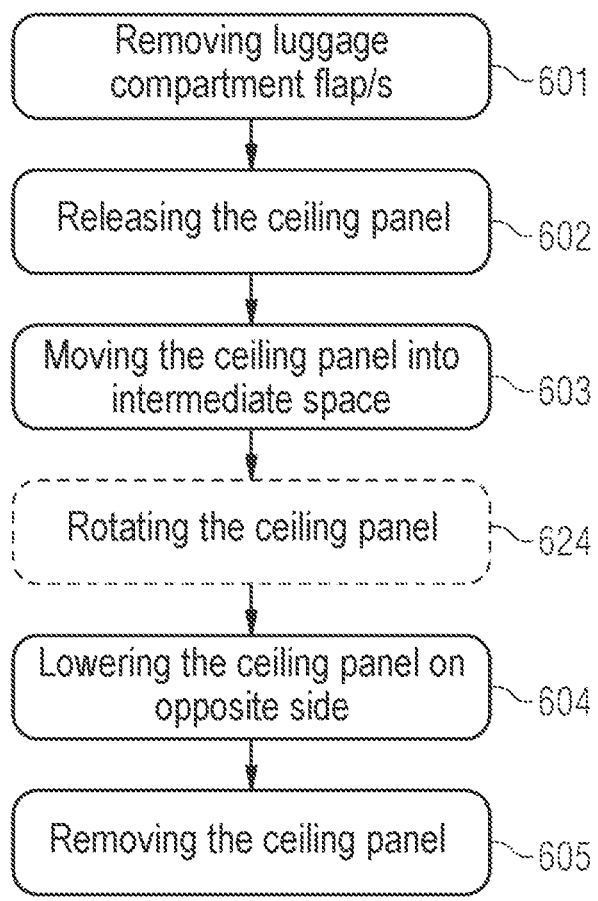

VEHICLE REGION WITH LUGGAGE COMPARTMENT AND CEILING PANEL ABOVE THE LUGGAGE COMPARTMENT, AND METHOD FOR ASSEMBLING AND DISASSEMBLING A CEILING PANEL ABOVE A LUGGAGE COMPARTMENT

CROSS-REFERENCES TO RELATED APPLICATIONS

This application claims the benefit of the International Application No. PCT/EP2021/057945, filed on Mar. 26, 2021, and of the German patent application No. 102020109169.9 filed on Apr. 2, 2020, the entire disclosures of which are incorporated herein by way of reference.

FIELD OF THE INVENTION

The present invention relates to a vehicle region with a luggage compartment with enlarged storage space below an overlapping ceiling panel, and to a method for assembling and disassembling a ceiling panel above two enlarged luggage compartments. In particular, the present invention relates to a vehicle region in the roof section of the primary structure of a vehicle having two luggage compartments and a ceiling panel, wherein the movement of the ceiling panel is limited by a luggage space of at least one of the luggage compartments, but not by a luggage compartment top of the luggage compartment. The present invention furthermore relates to a method for assembling and disassembling a ceiling panel, wherein the ceiling panel is guided at least partially through a luggage space of one of the luggage compartments from which the luggage compartment flap has been removed.

BACKGROUND OF THE INVENTION

In means of transport, particularly in aircraft, buses or trains, overhead luggage compartments, in which hand luggage can be stowed, are often installed above passenger seats. In addition, a ceiling panel is arranged above such luggage compartments in order to install an attractive visible surface in the passenger cabin. To avoid people looking behind the luggage compartment or past the ceiling panel, the ceiling panel is fastened on top of or on the luggage compartment or on top of/on two luggage compartments on two opposite sides of the ceiling panel.

Recently, passengers have been bringing more and more luggage into the passenger cabin, but vehicle operators also wish to accommodate more luggage in the passenger cabin (in order to shorten or avoid time-consuming loading and unloading of the cargo hold). To meet these requirements, more or larger luggage compartments must be accommodated in the passenger cabin. However, this regularly leads to a redesign of the passenger cabin. If used vehicles are then to be converted, this is cost-intensive since it is necessary not only to install larger luggage compartments but also to replace wall and/or ceiling panels.

If, in addition, overhead luggage compartments (arranged, for example, above passenger seats) which are larger than hitherto are to be installed, there is also less installation and removal space for ceiling panels in the ceiling region of the passenger cabin. Particularly, in the case of a plurality of overhead luggage compartments which are arranged to the right and left of a passenger aisle, for example, the distance between the two luggage compartments is smaller, and thus the installation and removal space for the ceiling panels is smaller.

SUMMARY OF THE INVENTION

It is an object of the invention to provide a vehicle region having luggage compartments and a ceiling panel, as well as installation and removal methods, which allow more storage space in a passenger cabin in a cost-effective and simple manner.

According to a first aspect for a better understanding of the present disclosure, a vehicle region comprises a roof section of a primary structure of the vehicle, a first luggage compartment, which is arranged below the roof section and delimits a first intermediate space between the primary structure and the first luggage compartment, and a second luggage compartment, which is arranged opposite the first luggage compartment and below the roof section. The first luggage compartment and the second luggage compartment can be overhead luggage compartments which are arranged above passenger seats in the vehicle. Here, "arranged opposite" should be viewed in the transverse direction of the vehicle. The two luggage compartments, the roof section of the primary structure and the intermediate space are thus all arranged in the same cross-sectional plane of the vehicle.

In the present disclosure, a longitudinal direction of a vehicle is the direction in which the vehicle usually moves (X axis, for example). Accordingly, a transverse direction is arranged perpendicularly to the longitudinal direction and extends in a cross section of the vehicle (Y axis, for example). A Z axis corresponds to a vertical which is perpendicular to the longitudinal direction and perpendicular to the transverse direction. In the present disclosure, terms such as "at the top", "at the bottom", "top", "bottom" and the like are used particularly with respect to a luggage compartment or a ceiling panel. These relate to the installed state of the luggage compartment or of the ceiling panel in the vehicle and along the Z axis. Furthermore, a front edge (of a luggage compartment top or a luggage compartment bottom, for example) points, for example, toward a passenger aisle (extending in the direction of the X axis) and thus to a passenger who is standing in the aisle in front of the luggage compartment and is looking parallel to the Y axis (transverse direction of the vehicle).

Furthermore, the vehicle region comprises a ceiling panel, which is arranged below the roof section and comprises a first side, which is arranged above the first luggage compartment, and a second side, which is opposite the first side and is arranged above the second luggage compartment. In other words, the ceiling panel of each of the luggage compartments overlaps on corresponding sides of the ceiling panel. The ceiling panel is an inner lining of the passenger cabin. This serves, in particular, to produce a visually appealing impression in the upper region of the luggage compartment since the overlapping ceiling panel screens out views into a region of the primary structure of the vehicle. For example, the first and second sides of the ceiling panel can be arranged in the first intermediate space or a second intermediate space (between the primary structure of the vehicle and above the second luggage compartment).

The first intermediate space can comprise an end point that is furthest away from the second luggage compartment and to which the first side of the ceiling panel can be moved. This spacing is also viewed in the transverse direction of the vehicle. The end point is thus further away from a vehicle center than, for example, the luggage compartment flap of the first luggage compartment or the first side of the ceiling panel in the installed state. Of course, the end point need not be a single point. On the contrary, it may also be a line or a region which extends, for example, in the longitudinal direction of the vehicle (X axis) and defines an end point in the cross section of the vehicle.

The fact that the first side of the ceiling panel can be moved to the end point means that there is a certain amount of play for the ceiling panel in the first intermediate space. At the end point, the first side of the ceiling panel, which is moved, for example, in the transverse direction of the vehicle from an installation position of the ceiling panel in the direction of the end point, strikes an obstacle, preventing the ceiling panel from continuing the movement. The obstacle can be, for example, a part of the primary structure of the vehicle, a part of the first luggage compartment and/or any component of the vehicle which is installed in the intermediate space. Thus, in the case of a free intermediate space, the end point (the end region) can be a region in which a rearward end of a luggage compartment top of the first luggage compartment is closest to the primary structure.

Furthermore, the second luggage compartment can comprise a detachable luggage compartment flap and a luggage compartment top, which forms the upper boundary of a part of a luggage space of the luggage compartment. The luggage space can be larger in the transverse direction of the vehicle than an extent of the luggage compartment top in this direction, so that the luggage compartment top forms the upper boundary of only part of the luggage space. In particular, the luggage space can be larger in the direction of the vehicle center, i.e., in the direction of the first luggage compartment, than the luggage compartment top. The luggage space is fully available for loading the luggage compartment with luggage and cargo. For example, the luggage space is also defined by further elements of the luggage compartment, which delimit the luggage space and protect objects stored therein from falling out of the luggage space, such as a side wall or the luggage compartment flap.

Moreover, a width of the ceiling panel, which extends from the first side to the second side of the ceiling panel, can be greater than a distance between the end point and an upper edge of the luggage space of the second luggage compartment, wherein the upper edge faces the roof section and the first luggage compartment. The upper edge of the luggage space runs in the longitudinal direction of the luggage compartment, which usually coincides with the longitudinal direction of the vehicle or runs virtually parallel to it in the installed state of the luggage compartment in the vehicle.

Here, the luggage compartment top can be configured in such a way that a front edge, facing the first luggage compartment, of the luggage compartment top is at a distance from the end point that is greater than or equal to the width of the ceiling panel. In other words, the ceiling panel, when it reaches the end point with its first side or is resting in this region, can (only just) be moved with its second side in front of the front edge of the luggage compartment top.

In the installed state, the ceiling panel can be arranged above the luggage compartment top of the first and/or second luggage compartment, such that the ceiling panel overlaps the corresponding luggage compartment top. As mentioned at the outset, this serves, in particular, for the visually appealing lining of the vehicle from the point of view of the passenger cabin. Even with the luggage compartment flap open, the ceiling panel can still be seen between the luggage compartment flap and the luggage compartment top.

The space available by virtue of the special position of the front edge of the luggage compartment top of the second luggage compartment is larger with the luggage compartment disclosed here than with conventional luggage compartments, and therefore, despite the overlap of the ceiling panel with the luggage compartment top, the ceiling panel can be removed simply and easily. This removal of the ceiling panel is necessary particularly during maintenance work and the like in order to reach lines, lamps, etc. which are arranged behind or to the side of the ceiling panel. An otherwise necessary removal of the entire luggage compartment can thereby be dispensed with, making the maintenance work more cost-effective.

For example, the ceiling panel can be released from its holders and moved in the direction of the end point to such an extent that, on its second side, it no longer overlaps with the luggage compartment top of the second luggage compartment. This side of the ceiling panel can then be lowered, the side of the ceiling panel moving through a luggage space of the luggage compartment until the ceiling panel is free underneath the luggage compartment. The ceiling panel can then be removed completely.

In addition, it is possible to remove smaller luggage compartments in existing vehicles and to install larger luggage compartments. An overlap region (in particular the overlap depth when viewed in the transverse direction of the vehicle) of the ceiling panel used hitherto with the luggage space of the larger luggage compartment would make it impossible to remove the ceiling panel. However, the "shortening" of the luggage compartment top according to the present disclosure makes it possible to retrofit larger luggage compartments in vehicles without having to install a new, smaller ceiling panel. The reuse (retention) of the existing ceiling panel allows cost-effective conversion of a vehicle to more storage space.

In an implementation variant, the second luggage compartment can comprise a fastening device, which is designed to rotatably fasten the luggage compartment flap on the luggage compartment, e.g., on the luggage compartment top, wherein an upper edge of the luggage compartment flap is spaced apart by a first distance from a front edge, facing the luggage compartment flap, of the luggage compartment top.

In other words, there is a gap between the upper edge of the luggage compartment flap and the front edge of the luggage compartment top. This gap can be achieved by means of the fastening device of the luggage compartment flap, for example, wherein the fastening device projects into the gap or spans the gap.

This arrangement makes it possible to remove the luggage compartment flap and to use the space defined by the gap when removing the ceiling panel. The first distance, i.e., the width of the gap, can be a few centimeters. In particular, the first distance is selected as a function of the width of the ceiling panel, the distance between the front edge of the luggage compartment top of the second luggage compartment and the end point, and the size of the luggage space (and, in particular, the position of the upper edge of the luggage space of the second luggage compartment).

In an implementation variant, the fastening device can comprise two sections, which are connected by a quick-release fastener. By means of the quick-release fastener, the fastening device can be disassembled quickly and easily into two parts, and the luggage compartment flap can be removed quickly. For example, a releasable connection can be provided between a joint of the fastening device, by means of which the luggage compartment flap is rotatably fastened on the luggage compartment top, and a section of the fastening device which is fastened on the luggage compartment top. The releasable connection can be implemented by a latching tab, a screw, or a similar element which can be released quickly. The releasable connection is advantageously arranged in such a way that a section of the fastening device which remains on the luggage compartment top is fastened fully on the luggage compartment top, i.e., does not project into the gap between the front edge of the luggage compartment top and the upper edge of the luggage compartment flap.

In another implementation variant, the second luggage compartment can comprise a partition, which divides the luggage space and is arranged substantially perpendicular to the luggage compartment top and the luggage compartment flap. For example, in the installed state of the luggage compartment, the partition can be arranged in the transverse direction of the vehicle (i.e., in a plane formed by the Y and Z axes). The partition can have a concave front edge facing the luggage compartment flap. The concave front edge of the partition is at its greatest distance from the luggage compartment flap in a central region of the front edge, while the upper and lower ends of the front edge of the partition are arranged closest to the luggage compartment flap.

In this case, the concavely shaped front edge of the partition can be shaped in such a way that one side (side edge) of a ceiling panel to be removed or installed can be moved along the front edge. For example, the concavely shaped front edge can represent a circular segment or a section of an ellipse which corresponds to the movement of the ceiling panel during removal or installation.

Alternatively, the partition can also have a substantially rectilinearly shaped front edge. As a result, a gap between the front edge of the partition and the luggage compartment flap may be larger, at least in some sections, but, on the other hand, the partition is thus easier to produce and does not hinder the ceiling panel during removal or installation.

In a further variant, the partition can be designed in such a way that the upper end of the front edge of the partition does not project into the gap between the front edge of the luggage compartment top and the upper edge of the luggage compartment flap. In other words, the upper end of the front edge of the partition is arranged below the luggage compartment top or coincides with the front edge of the luggage compartment top. This ensures that the partition does not hinder the movement of the ceiling panel through the luggage space of the luggage compartment.

In yet another implementation variant, the partition can be fastened detachably on the luggage compartment. This enables the partition to be completely removed from the luggage space of the luggage compartment, thereby also making the latter fully available for a movement of the ceiling panel.

In a further implementation variant, the luggage compartment can further comprise a side wall, which delimits the luggage space laterally in the longitudinal direction, and has a front edge, which faces the luggage compartment flap and has a shape corresponding to a cross section of the luggage compartment flap. In the installed state of the luggage compartment in the vehicle, the side wall is arranged at the front or rear of the luggage compartment along the longitudinal direction of the vehicle (X axis). The shape of the front edge allows the luggage space to be closed off by the luggage compartment flap, which can rest against the front edge of the side wall when the luggage compartment flap is in a closed position, for example.

The side wall, which is shaped in accordance with the cross section of the luggage compartment flap, prevents objects from falling out of a closed luggage compartment and prevents persons or objects from being trapped in a gap between the side wall and the luggage compartment flap. The side wall which closes off the luggage space nevertheless does not hinder the removal or installation of a ceiling panel. On the one hand, the ceiling panel can have an extent (length) in the longitudinal direction of the vehicle (X axis) which corresponds to an extent (length) of the luggage compartment. The ceiling panel can then be rotated a little about the Z axis during removal or installation, such that a corner of the ceiling panel can be moved through the luggage space of the luggage compartment along a side wall of the luggage compartment. During this process, the other corner of the ceiling panel when viewed in the longitudinal direction is located outside the luggage space and in front of the other side wall of the luggage compartment.

Alternatively, the side wall can have a front edge which is shaped concavely or substantially rectilinearly. This enables the side wall to be produced more simply and inexpensively. In order to avoid a slot or an opening between the front edge of the side wall and the luggage compartment flap, the luggage compartment flap can have a section which points toward the front edge of the side wall. This flange-like section allows the luggage space to be closed completely, while the flange is moved away with the luggage compartment flap and thus opens up the removal space or installation space for the ceiling panel.

Alternatively or additionally, the side wall and/or the partition can comprise at least two sections. In this case, at least one section facing the luggage compartment flap can be fastened detachably on the luggage compartment. For example, the detachable section/s can be pushed into and pulled out of corresponding holding devices. After a detachable section has been removed, a ceiling panel can be moved through the luggage space of the luggage compartment without a side wall or partition hindering the movement of the ceiling panel. As a result, it is also possible to remove or install ceiling panels which have a greater extent in the longitudinal direction of the vehicle (i.e., length of the ceiling panel) than the luggage compartment.

In an implementation variant, the front edge of the luggage compartment top of the second luggage compartment can be recessed in at least one section and can be spaced apart there by a second distance from the upper edge of the luggage compartment flap, wherein the second distance is greater than the first distance. In other words, the front edge of the luggage compartment top forms with the upper edge of the luggage compartment flap, a gap which has different widths. When the ceiling panel is installed, this gap lies in a lateral end region of the ceiling panel. In other words, one side or one lateral end of the ceiling panel is arranged approximately above the gap. Of course, the side or the lateral end of the ceiling panel can also be arranged above the luggage compartment top of the luggage compartment, such that the gap is completely spanned by the ceiling panel.

Often, lighting is provided in this lateral region of the ceiling panel, for example indirect lighting, which is hidden behind the ceiling panel or between the ceiling panel and the upper side of the luggage compartment top. Since a larger luggage compartment can now be installed, the luggage compartment top of the luggage compartment would cover this lighting, thus making necessary a new lighting concept for the passenger cabin. Light can radiate into the passenger cabin through the gap between the front edge of the luggage compartment top and the upper edge of the luggage compartment flap. The gap is also open in an open state of the luggage compartment flap and thus makes it possible to illuminate the passenger cabin with an existing lighting device. This makes it possible to continue using existing lighting even if a passenger cabin is equipped with larger luggage compartments. As a result, conversion costs for the passenger cabin are likewise kept low.

In another implementation variant, the second luggage compartment can further comprise at least one holding device, which is arranged on an upper side of the luggage compartment top and is designed to fasten a cover panel. One simple variant of a holding device is a horizontal component which is arranged on the upper side of the luggage compartment top and has an opening through which a corresponding pin or similar pin-shaped element of the ceiling panel can be inserted and fastened thereon. In this case, the pin of the ceiling panel can have one or more latching elements, which ensure/s secure fastening of the ceiling panel on the holding device.

In a further implementation variant, a luggage compartment bottom of the second luggage compartment, which delimits the luggage space of the second luggage compartment at the bottom, can also have a front edge. Here, the luggage compartment bottom can be configured in such a way that the front edge, facing the first luggage compartment, of the luggage compartment bottom is at a distance from the end point that is greater than or equal to the width of the ceiling panel. In other words, the luggage compartment bottom can also be dimensioned and configured as a function of the width of the ceiling panel.

In this case, a distance between the end point in the first intermediate space and a lower edge of the luggage space of the second luggage compartment, which edge faces the first luggage compartment and faces away from the roof section, can be smaller than the width of the ceiling panel. Here, the luggage space is likewise suitable for accommodating larger pieces of luggage or larger cargo than in the case of conventional smaller luggage compartments, it being possible for large ceiling panels, dimensioned for conventional smaller luggage compartments for example, to continue to be installed and removed by virtue of the position of the front edge of the luggage compartment bottom.

All the implementation variants and shapes which are described in relation to the second luggage compartment can likewise be implemented and/or applied on or to the first luggage compartment, in particular the luggage compartment flap and luggage compartment top of the first luggage compartment.

According to a second aspect for a better understanding of the present disclosure, a method for installing a vehicle region according to the first aspect or one of its implementation variants in a vehicle comprises the following steps:

introducing a first side of the ceiling panel into a first intermediate space between a primary structure of the vehicle and a first one of the luggage compartments;

lifting a second side of the ceiling panel, which is opposite the first side, wherein the second side of the ceiling panel is guided at least partially through a luggage space of a second one of the luggage compartments and is guided past a front edge of a luggage compartment top of the second luggage compartment;

moving the ceiling panel with its second side into a second intermediate space between the primary structure of the vehicle and the second luggage compartment; and fastening the first side of the ceiling panel on a holding device on an upper side of the luggage compartment top of the first luggage compartment and fastening the second side of the ceiling panel on a holding device on an upper side of the luggage compartment top of the second luggage compartment.

For example, the ceiling panel can be installed above two luggage compartments, wherein at least one of the two luggage compartments is a luggage compartment according to the description of the vehicle region of the first aspect. The intermediate spaces between the primary structure of the vehicle and the respective luggage compartment are thus likewise arranged above the luggage compartments, e.g., above a respective luggage compartment top of the luggage compartments. The two luggage compartments can be arranged opposite one another when viewed in the transverse direction of the vehicle (Y axis). For example, the luggage compartment flaps of both luggage compartments can face one another.

The intermediate space between the primary structure of the vehicle and the first luggage compartment is usually provided for lines and other supply elements of the vehicle. However, there is usually sufficient space above the luggage compartments for at least a certain part thereof to be empty and to form the respective intermediate space. The intermediate space does not have to include the entire space between the primary structure of the vehicle and the luggage compartment (in particular the luggage compartment top of the luggage compartment). On the contrary, lines and other elements can also be arranged in the intermediate space since a ceiling panel is usually relatively flat and can thus also be pushed in (introduced) between lines and the luggage compartment top of the luggage compartment or between lines and the primary structure of the vehicle.

Here, the lifting of the second side of the ceiling panel takes place in a state in which the first side of the ceiling panel is arranged in the intermediate space. In other words, the ceiling panel is rotated about an axis which lies in a region of the first side of the ceiling panel and furthermore lies above and substantially parallel to an upper side of the luggage compartment top of the first luggage compartment (and extends in the longitudinal direction of the vehicle, for example). By virtue of the movement of the ceiling panel through the luggage space of the luggage compartment (and also by virtue of the utilization of the first intermediate space), it is possible to install a ceiling panel above the luggage compartments which has a greater extent (width) in a transverse direction of the vehicle than the free space between the two luggage compartments. In other words, a ceiling panel can be installed above the luggage compartments which overlaps each of the two luggage compartments, thus making it impossible to see into the intermediate space between the primary structure of the vehicle and the luggage compartment. In this case, the width of the ceiling panel can be greater than the distance between the end point in the first intermediate space and the upper edge of the luggage space of the second luggage compartment, which would make it impossible to install or remove the ceiling panel in the case of conventionally designed luggage compartments. It is likewise possible to install existing ceiling panels which are dimensioned for earlier smaller luggage compartments, even if larger luggage compartments are now present (retrofitted) in the vehicle.

In an implementation variant, the method can further comprise inserting and fastening a luggage compartment flap on the first luggage compartment and/or inserting and fastening a luggage compartment flap on the second luggage compartment. In other words, during the installation of the ceiling panel on at least one of the luggage compartments, there was no luggage compartment flap. It is possible to dispense with a luggage compartment flap particularly on the second of the luggage compartments, thereby making it possible to guide the ceiling panel through the luggage space of the second luggage compartment in a simple manner.

Guiding the second side of the ceiling panel past the front edge of the luggage compartment top of the second luggage compartment is made possible or facilitated by the position of the front edge of the luggage compartment top of the second luggage compartment with respect to the end point in the first intermediate space. The gap required for this purpose between the upper edge of the luggage compartment flap and the front edge of the luggage compartment top can be achieved by means of a fastening device of the luggage compartment flap, for example, wherein the fastening device projects into the gap.

The space gained by means of this gap can be utilized when installing the ceiling panel. Despite the gap, it is not possible to see into the intermediate space above the luggage compartment since the ceiling panel (particularly in the case of earlier larger ceiling panels for smaller luggage compartments) is arranged above the gap and extends into the intermediate space.

Thus, even already existing ceiling panels for smaller luggage compartments can be installed in a vehicle in which larger luggage compartments with more storage space have subsequently been installed. The reuse of the existing ceiling panels makes it possible to reduce conversion costs.

In a further implementation variant, the method can further comprise, before introducing the first side of the ceiling panel, removing a partition from the second luggage compartment and introducing the second side of the ceiling panel into the luggage space of the second luggage compartment. Removing the partition (completely) from the second luggage compartment ensures that the luggage space of the second luggage compartment is (completely) available for the installation of the ceiling panel. In this case, the introduction of the first side of the ceiling panel into the first intermediate space is simplified by the fact that the ceiling panel is already closer to the roof section of the primary structure.

According to a third aspect for a better understanding of the present disclosure, a method for removing a ceiling panel of a vehicle region according to the first aspect or one of its implementation variants comprises the following steps:

removing a luggage compartment flap from at least one of the two luggage compartments;

releasing one fastening each of the ceiling panel from a respective holding device on the two luggage compartments;

moving the ceiling panel, wherein a first side of the ceiling panel is arranged in a first intermediate space between a primary structure of the vehicle and a first of the two luggage compartments;

lowering a second side of the ceiling panel, which is opposite the first side, wherein the second side of the ceiling panel is guided past a front edge of a luggage compartment top of a second of the two luggage compartments and is guided at least partially through a luggage space of the second luggage compartment; and removing the ceiling panel from the first intermediate space.

According to the method according to the second aspect, even a relatively large ceiling panel (for example, a ceiling panel previously used and dimensioned for small luggage compartments) can be used in a vehicle. Removal while utilizing the intermediate space between the primary structure of the vehicle and the first luggage compartment and guidance of the ceiling panel through the luggage space of the second luggage compartment allows rapid maintenance work during which the ceiling panel must be removed. By removing a luggage compartment flap of at least one of the luggage compartments, additional removal space is gained for the ceiling panel during removal, which space is located in front of the front edge of the luggage compartment top of the luggage compartment.

In an implementation variant, lowering the second side of the ceiling panel can further comprise guiding the second side of the ceiling panel past a front edge of a luggage compartment bottom of the second luggage compartment while the first side of the ceiling panel is still in the first intermediate space. In other words, the second side of the ceiling panel describes a movement path which leads from the front edge of the luggage compartment top to the front edge of the luggage compartment bottom of the second luggage compartment.

In a further implementation variant, guiding the second side of the ceiling panel past the front edge of the luggage compartment bottom can include elastically deforming a terminal lip projecting from the second side of the ceiling panel. This makes it possible to provide a larger luggage compartment, i.e., with a larger luggage space, since the luggage compartment bottom of the luggage compartment can extend further into the vehicle interior (toward a center of the vehicle). The resulting greater depth of the luggage space makes it possible to introduce larger pieces of luggage or cargo into the luggage space. Accordingly, the front edge of the luggage compartment top can also extend further into the vehicle interior, and the gap between the front edge of the luggage compartment top and the upper edge of the luggage compartment flap as well as the distance between the front edge of the luggage compartment top and the end point in the first intermediate space can be smaller. The flexible terminal lip can be produced from a plastic, rubber or the like, for example.

In another implementation variant, the ceiling panel can be rotated before lowering the second side of the ceiling panel, such that, as the second side of the ceiling panel is lowered, a corner of the ceiling panel, which is located on the second side, moves through the luggage space of the second luggage compartment. It is possible for the ceiling panel to be rotated about a vertical (Z axis), for example.

In yet a further implementation variant, the second luggage compartment can have a partition, which divides the luggage space of the second luggage compartment and has a front edge facing the luggage compartment flap. The front edge can be shaped in accordance with the variant from the first aspect. As a result, the second side of the ceiling panel can be moved along the front edge of the partition as it is lowered.

In an implementation variant, the method can also be used for removing a plurality of ceiling panels. After the removal of the ceiling panel from the first intermediate space and thus after the removal of the entire ceiling panel from the vehicle region, an adjacently arranged ceiling panel can be released from its fastening and moved along a longitudinal direction of the vehicle (X axis) to the first and second luggage compartments. There, the steps of moving the ceiling panel, lowering a second side of the ceiling panel and removing the ceiling panel from the first intermediate space can be carried out correspondingly for the previously adjacent ceiling panel. It is thereby possible to remove a multiplicity of ceiling panels from the vehicle, while the luggage compartment flap has to be removed from only one luggage compartment. This makes it a quick and simple matter to remove the multiplicity of ceiling panels, thereby making maintenance work and the like which require the removal of the ceiling panels less expensive, for example. Of course, it is also possible to carry out the installation of a plurality of ceiling panels in the reverse order, in which case the luggage compartment flap has to be removed from just one luggage compartment in order to install a multiplicity of ceiling panels in the vehicle region.

In yet another implementation variant, the second luggage compartment can have a partition, which divides the luggage space of the second luggage compartment, the method further comprising the following steps:

removing the partition from the second luggage compartment;

while lowering the second side of the ceiling panel, introducing the second side of the ceiling panel into the luggage space of the second luggage compartment;

lowering the first side of the ceiling panel, wherein the first side of the ceiling panel is guided past a front edge of a luggage compartment top of the first luggage compartment and is guided at least partially through a luggage space of the first luggage compartment; and guiding the second side of the ceiling panel out of the luggage space of the second luggage compartment.

Removing the partition makes the entire luggage space of the second luggage compartment available when the ceiling panel is being lowered. As a result, the first side of the ceiling panel can be removed from the intermediate space and guided past in front of the front edge of the luggage compartment top of the first luggage compartment. In other words, the removal of the ceiling panel takes place not only with a rotational movement about an axis in the first intermediate space, but, after the rotational movement about the axis in the first intermediate space has taken place, also with a reverse rotation about an axis in a region of the second side of the ceiling panel, which is now located in the luggage space of the second luggage compartment. It is thereby possible to remove large ceiling panels easily and quickly.

In an implementation variant, the method can also comprise removing a side wall of the second luggage compartment. As a result, it is also possible to use this method to remove ceiling panels which have an extent (length) in the longitudinal direction of the vehicle (X axis) which corresponds at least to the extent (length) of a luggage compartment.

According to yet another aspect for a better understanding of the present disclosure, a vehicle comprises a vehicle region according to the first aspect.

Furthermore, the aspects, implementation variants and further embodiments described above can of course be combined without this being explicitly described. Each of the implementation variants described should thus be regarded as optional to each of the aspects, embodiments and implementation variants or even combinations thereof. Thus, the present disclosure is not restricted to the individual implementation variants and embodiments in the order described or to a particular combination of the aspects and implementation variants.

BRIEF DESCRIPTION OF THE DRAWINGS

Preferred exemplary embodiments of the invention are now explained in greater detail by means of the schematic drawings, wherein:

FIGS. 11A and 11B show schematically a perspective view of a luggage compartment with a removable partition and a sequence of positions during installation or removal of a ceiling panel;

FIG. 12 shows a flowchart for methods of installing a ceiling panel; and

FIG. 13 shows a flowchart for methods of removing a ceiling panel.

DETAILED DESCRIPTION OF THE PREFERRED EMBODIMENTS

Figure 1:
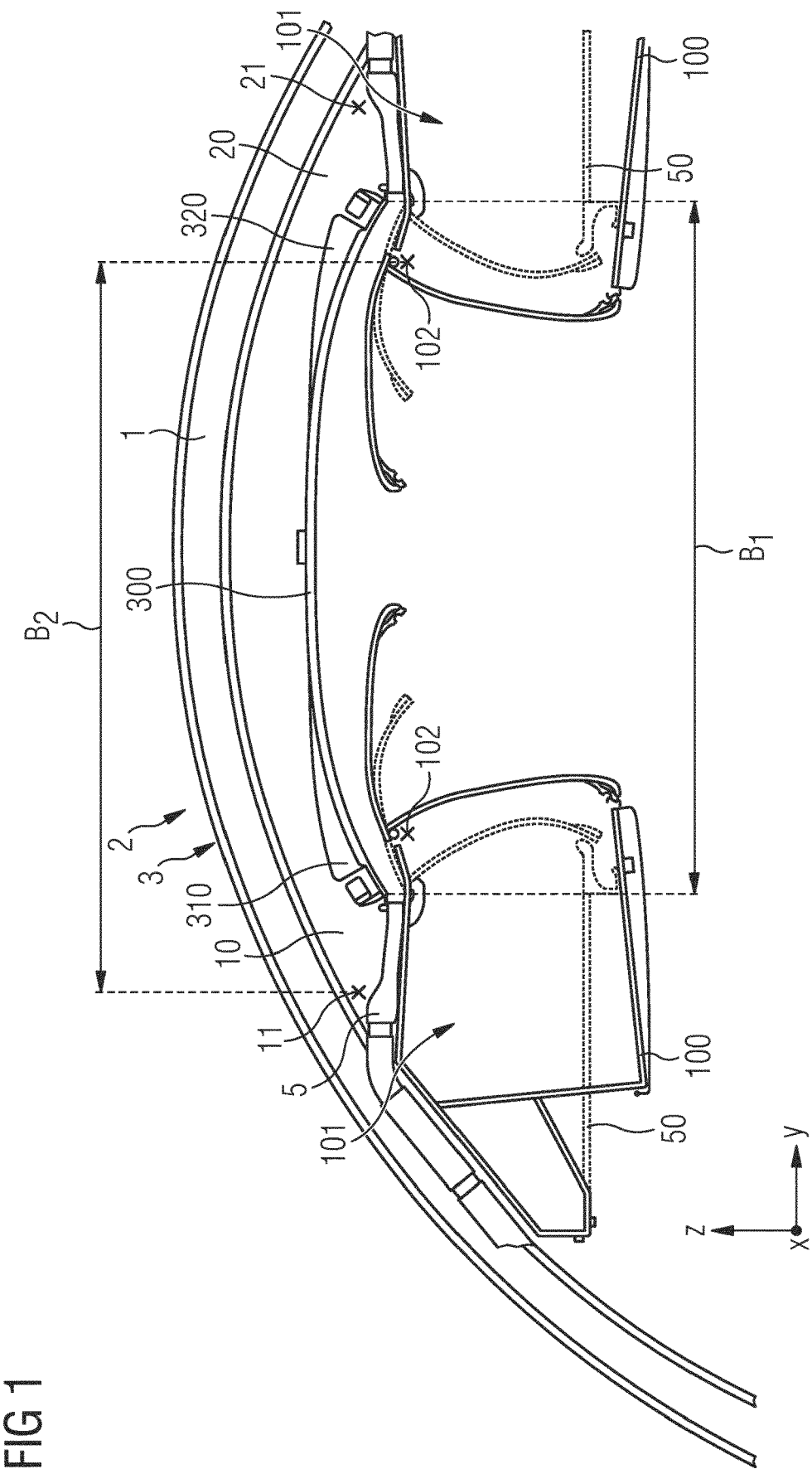
FIG. 1 shows schematically a cross-sectional view of a vehicle region with conventional luggage compartments and luggage compartments according to the present disclosure.

FIG. 1 shows schematically a cross-sectional view of a vehicle 1, and, in particular, a vehicle region 2. The vehicle region 2 comprises a roof section 3 of a primary structure 1 of the vehicle. Furthermore, FIG. 1 shows conventional luggage compartments 50 (shown by dashed lines) and luggage compartments 100 according to the present disclosure. The luggage compartments 100 according to the present disclosure offer a larger storage space or luggage space 101 compared to the conventional luggage compartments 50. To achieve this, the luggage compartments 100 project further into the interior of the passenger cabin.

A ceiling panel 300 is arranged above the luggage compartments 100 and below the roof section 3 and can be fastened on a holding device 190 (FIGS. 8 and 9) on an upper side of the luggage compartment 100, for example. The ceiling panel 300 is dimensioned in such a way that it spans the free space between the conventional luggage compartments 50. If the conventional ceiling panel 300 now continues to be used with the luggage compartments 100 according to the present disclosure, a much larger area of overlap in the transverse direction of the vehicle (Y axis) is obtained. This would make it more difficult or impossible to install or remove the ceiling panel 300 with the luggage compartments 100 fitted. In order to ensure the installation or removal of the ceiling panel 300, at least one of the two luggage compartments 100 is of special configuration.

Indeed, once released from the holding device 190, a ceiling panel 300 can be moved into and out of a first intermediate space 10 between the primary structure 1 and the first luggage compartment 100 and into a second intermediate space 20 between the primary structure 1 and the second luggage compartment 100. However, the width B1 of the ceiling panel 300 is greater than a distance B2 between an end point 11 in the first intermediate space 10 and an upper edge 102 of the luggage space 101 of the second luggage compartment 100. The upper edge 102 of the luggage space 101 faces the roof section 3 and the first luggage compartment 100. If the first and second luggage compartments 100 were configured in exactly the same way as the conventional luggage compartments 50 (only larger), it would not be possible for the ceiling panel 300 to be guided past the upper edge 102 of the luggage space 101, and thus not past the upper edge of the luggage compartment 100. The space between the first end point and an upper edge of the luggage compartment 100 would be too small for the width B1 of the ceiling panel 300.

Figure 2:
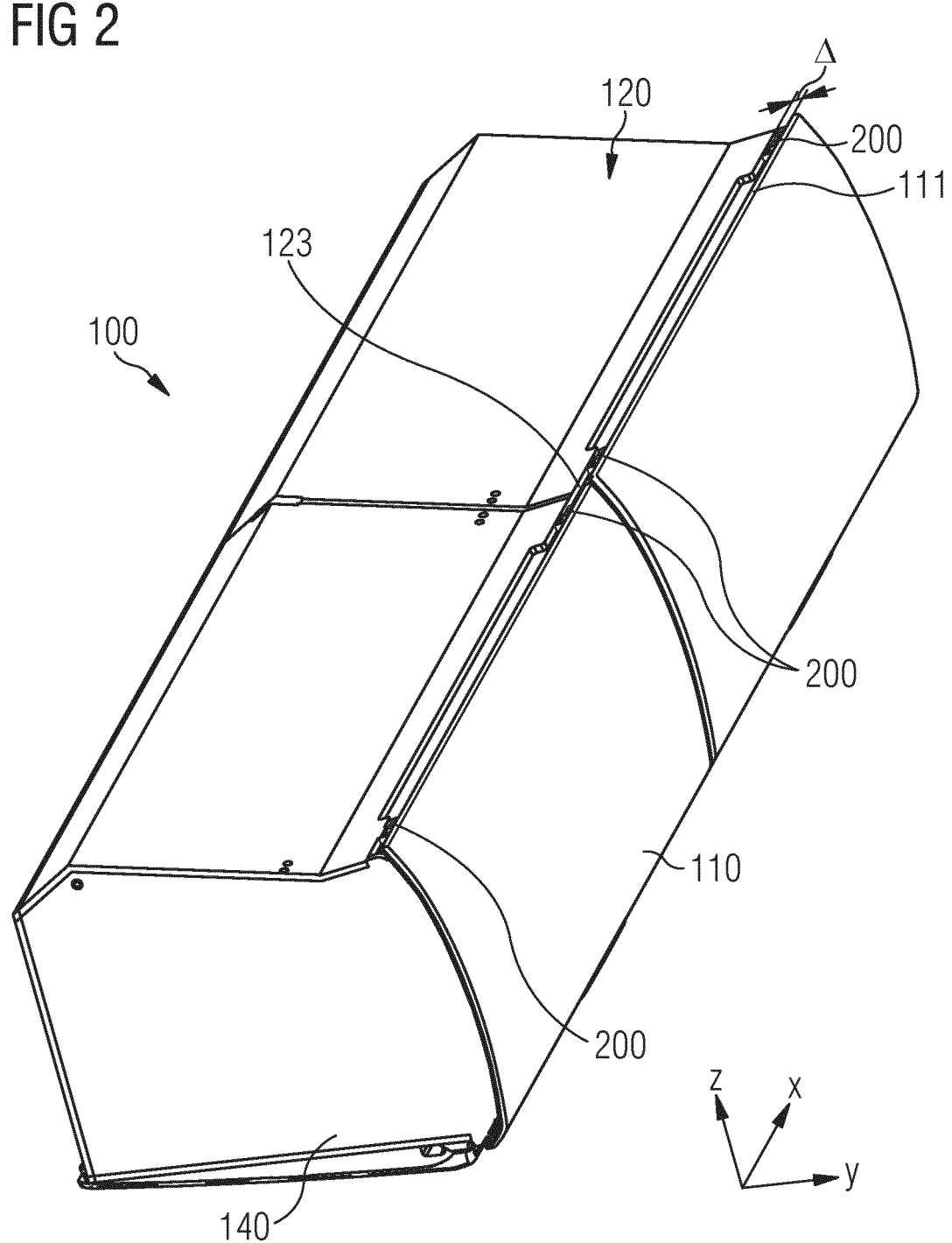
FIG. 2 shows schematically a perspective view of a luggage compartment.

Thus, FIG. 2 shows schematically a perspective view of a luggage compartment 100 according to the present disclosure, for example the second luggage compartment 100, which is shown on the right in FIG. 1. The luggage compartment 100 has at least one luggage compartment flap 110, at least one luggage compartment top 120 and at least one side wall 140. In this case, the luggage compartment flap 110 is fastened detachably on the luggage compartment 100, e.g., on the luggage compartment top 120 and/or on a side wall 140. Furthermore, the luggage compartment flap 110 is fastened rotatably on the luggage compartment 100, e.g., on the luggage compartment top 120, by a fastening device 200.

In the installed state of the luggage compartment flap 110, an upper edge 111 of the luggage compartment flap 110 is spaced apart by a first distance A from a front edge 123 of the luggage compartment top 120. By means of this distance A, it is possible to obtain additional space for the installation or removal of the ceiling panel 300 with the luggage compartment flap 110 removed (detached). The upper edge 111 of the luggage compartment flap 110 approximately defines the upper edge 102 of the luggage space 101 since pieces of luggage and cargo can lie in the interior of the luggage compartment 100 up to the luggage compartment flap 110. The first distance A can now be added to the distance B2 between the end point 11 and the upper edge 102 of the luggage space 101. This results in a further distance B3 (see FIG. 8) between the front edge 123 of the luggage compartment top 120 and the end point 11 in the first intermediate space 10, this distance being greater than or equal to the width B1 of the ceiling panel 300. As a result, it is possible to remove and install the ceiling panel 300. The first distance A can be achieved, for example, by means of a corresponding fastening device 200 (FIG. 7) which projects from a front edge 123 of the luggage compartment top 120.

Figure 3:
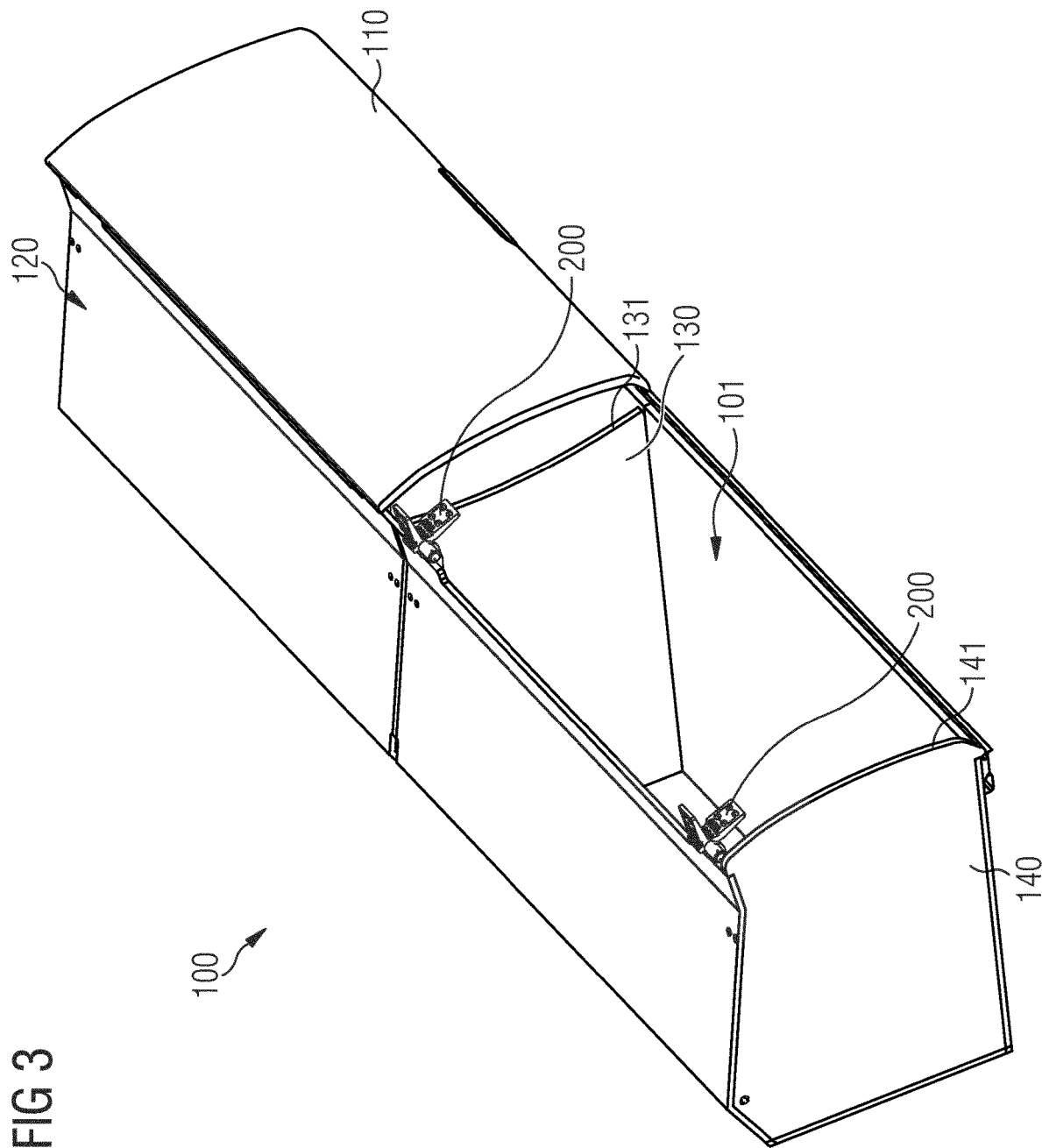
FIG. 3 shows schematically a perspective view of a luggage compartment with a luggage compartment flap removed.
Figure 4:
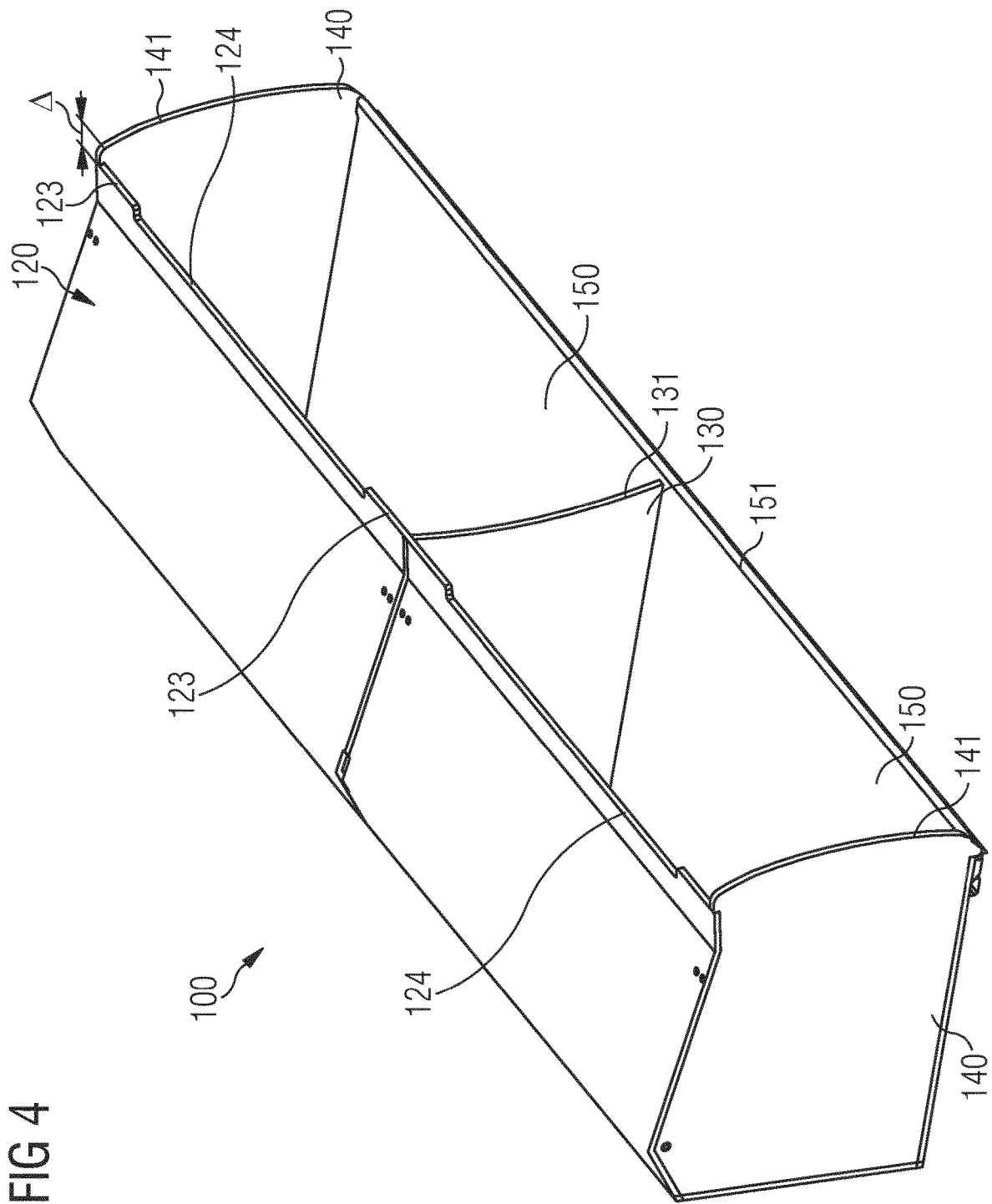
FIG. 4 shows schematically a perspective view of a luggage compartment with luggage compartment flaps removed.
Figure 5:
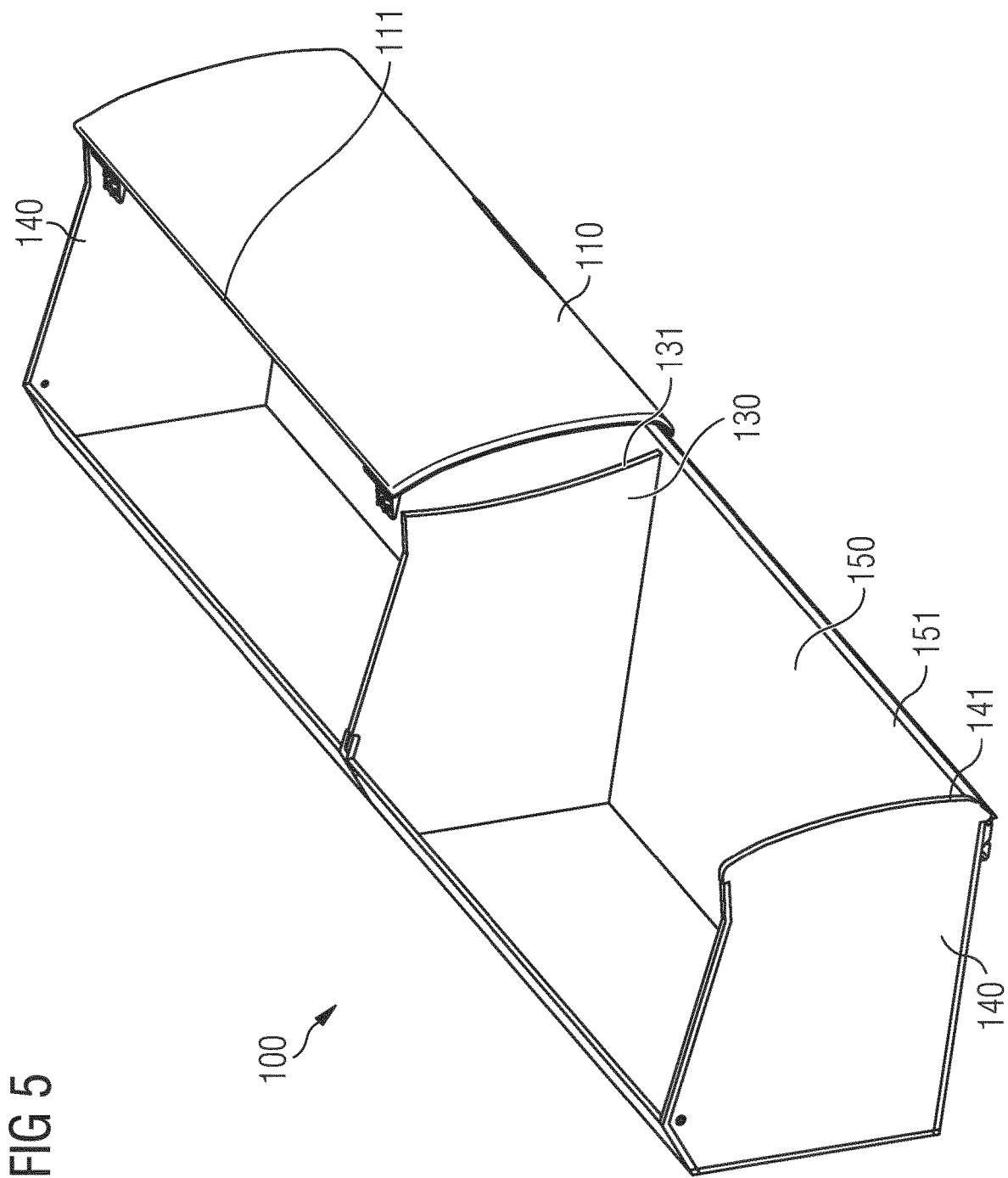
FIG. 5 shows schematically a perspective view of a luggage compartment with luggage compartment flaps removed and luggage compartment tops removed.

FIGS. 3 to 5 show schematic perspective views of the luggage compartment 100 with the luggage compartment flap/s 110 removed and the luggage compartment top/s 120 removed in order to illustrate the details of the luggage compartment 100. FIG. 3 illustrates two fastening devices 200, here in the form of a hinge in each case, both in the closed state of the luggage compartment flap 110 and in the open state, with the luggage compartment flap 110 removed. Furthermore, the luggage compartment may have a partition 130, which divides a luggage space 101 in the longitudinal direction (X axis). The partition 130 can in each case be arranged substantially perpendicular to the luggage compartment top 120 and the luggage compartment flap 110. Here, substantially perpendicular means at an angle of 90°+/−5°. The partition 130 can have a concave front edge 131 facing the luggage compartment flap 110. Here, concave means that a lens-shaped intermediate space is formed between the luggage compartment flap 110 and the front edge 131 of the partition 130.

The fastening devices 200 (joints for the luggage compartment flap 110), which are still partially illustrated in FIGS. 3 and 5, are shown only for the sake of clarity. When the luggage compartment flap 110 is removed, the fastening device is preferably removed to such an extent that no section of the fastening device remains in front of the front edge 123 of the luggage compartment top 120.

In contrast to the partition 130, one or both side walls 140 can have a front edge 141 with a shape corresponding to a cross section of the luggage compartment flap 110. As a result, the luggage compartment flap 110 can end with the front edge 141 of the side wall 140 and securely close the luggage space 101. For example, the front edge 141 of the side wall or side walls 140 can have a convex shape or alternatively a substantially straight shape.

At its upper end, the front edge 131 of the partition 130 can be arranged flush with the front edge 123 of the luggage compartment top 120. In corresponding fashion, a lower end of the front edge 131 of the partition 130 can be arranged flush with a front edge 151 of a luggage compartment bottom 150 of the luggage compartment 100. Of course, the upper end and/or the lower end of the front edge 131 of the partition 130 can also be set back. In other words, the front edge 131 of the partition 130 can be located further in the luggage space 101 than the front edge 123 of the luggage compartment top 120 and/or the front edge 151 of the luggage compartment bottom 150.

With the luggage compartment flap 110 completely removed (see, for example, FIG. 4), a working space is formed by the distance A and the (for example, concave) profile of the front edge 131 of the partition 130 and is available for the installation or removal of a ceiling panel 300.

Figure 6:
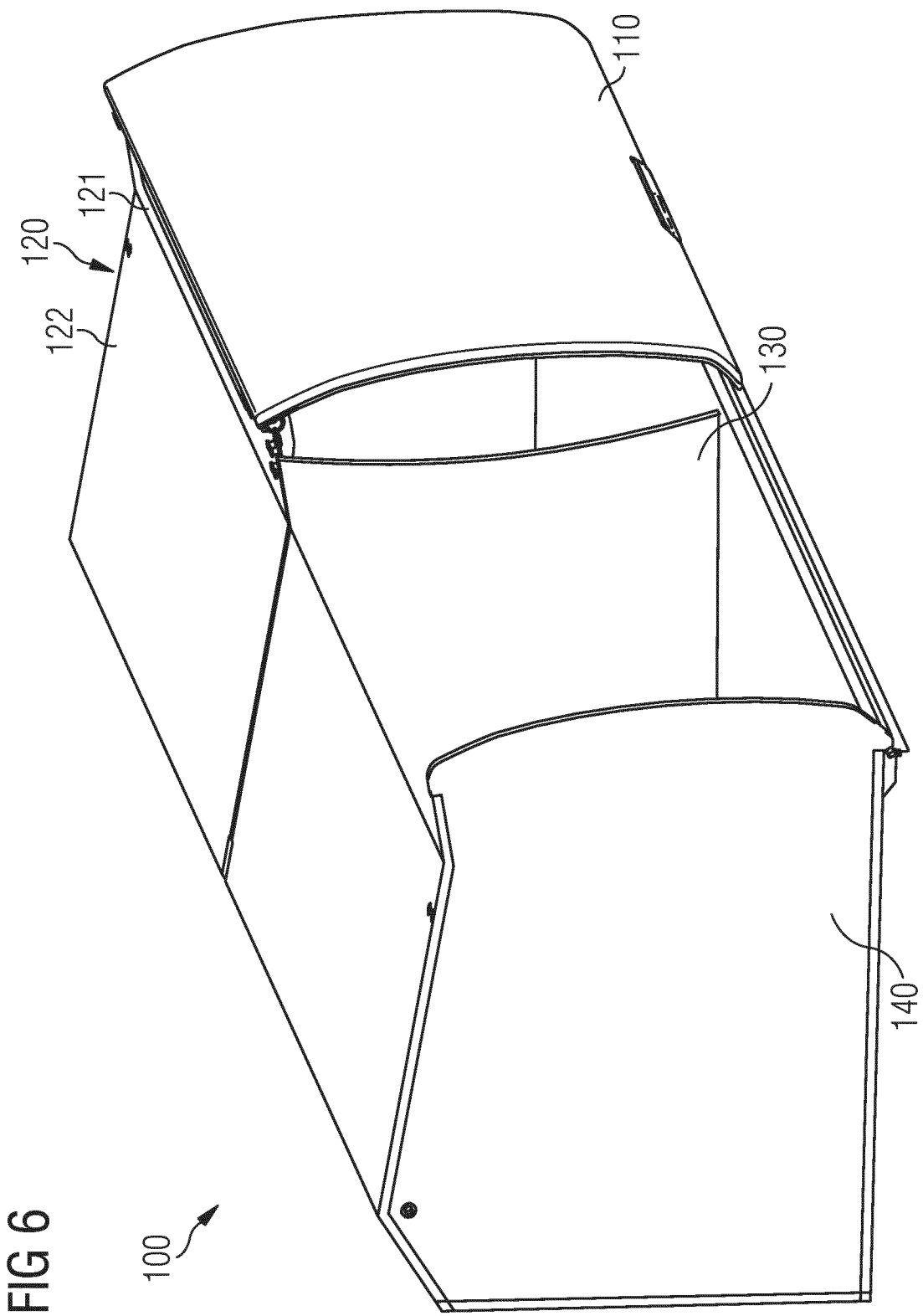
FIG. 6 shows schematically a perspective view of a luggage compartment with a luggage compartment top partially removed.

Additional working space can be created if the luggage compartment top 120 also has a first section 121 which can be detached from a second section 122 and thus removed. The removal of a first section 121 of a part of the luggage compartment top 120 is illustrated in FIG. 6. For example, the fastening device 200 can be fastened on the first section 121 of the luggage compartment top 120 or can be integrated therein. By removing the first section 121, the fastening device 200 and optionally, at the same time, also the luggage compartment flap 110 (still) fastened on the fastening device 200 can also be removed in one working step.

Figure 7A:
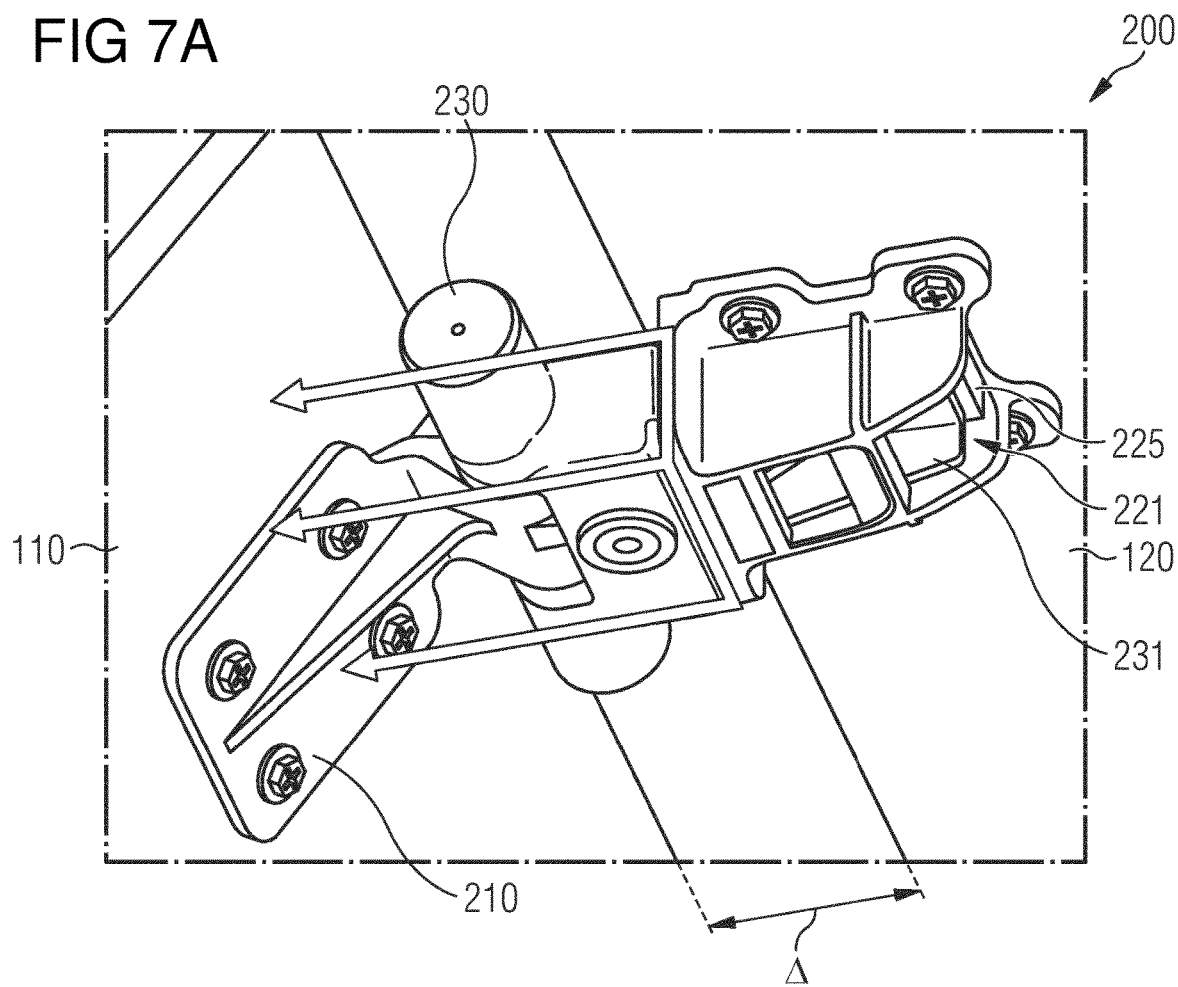
FIGS. 7A, 7B and 7C show schematically perspective views of a fastening device for a luggage compartment flap.
Figure 7B:
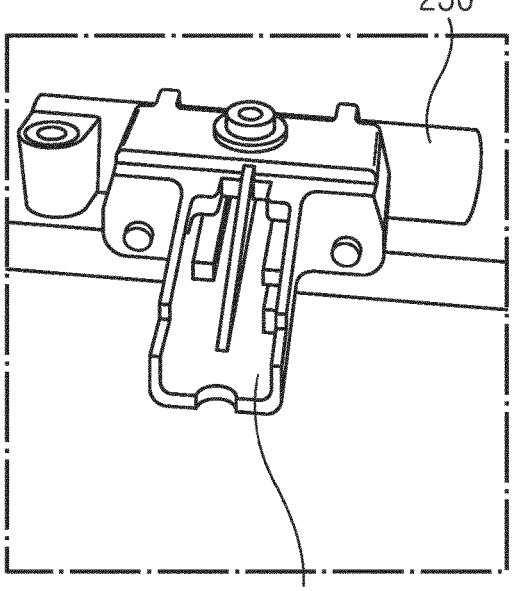
Figure 7C:
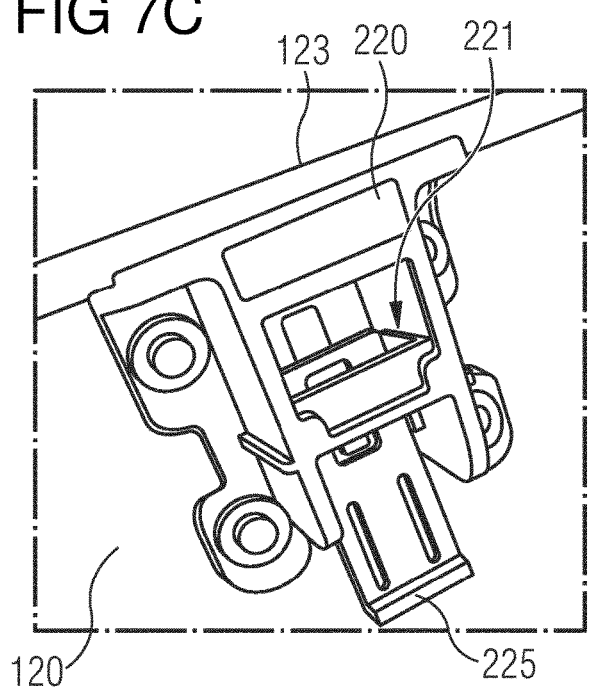

FIGS. 7A, 7B and 7C show schematically perspective views of a fastening device 200 for a luggage compartment flap 110. Thus, the fastening device 200 can have a joint 230, thereby enabling the luggage compartment flap 110 to be fastened rotatably on the luggage compartment 100. It is possible, for example, as illustrated in FIG. 7C, for a section 220 of the fastening device 200 to be fastened on a luggage compartment top 120 of the luggage compartment 100. Adjoining this is the joint 230, on which a further section 210 of the fastening device 200 is arranged. The further section 210 is used to fasten the luggage compartment flap 110 and is rotatable relative to the section 220 by means of the joint 230.

The section 220 can be connected to the further section 210 and/or the joint 230 by means of a quick-release fastener 225. The quick-release fastener 225 can consist of a plug-in element 231, which is arranged on the joint 230, and a corresponding opening 221 in the section 220. The plug-in element 231 can be pushed into the opening 221 in the section 220 and can be fixed in a latched position in the section 220 by means of a latching tab. By bending up the tab 225, the plug-in element 231 can be released from the lock and removed from the opening 221. The section 220 which remains on the luggage compartment top 120 is dimensioned in such a way that it is completely covered by the luggage compartment top 120. In other words, the remaining section 220 is arranged completely on the luggage compartment top 120, i.e., does not project beyond the front edge 123 of the luggage compartment top 120.

Figure 8:
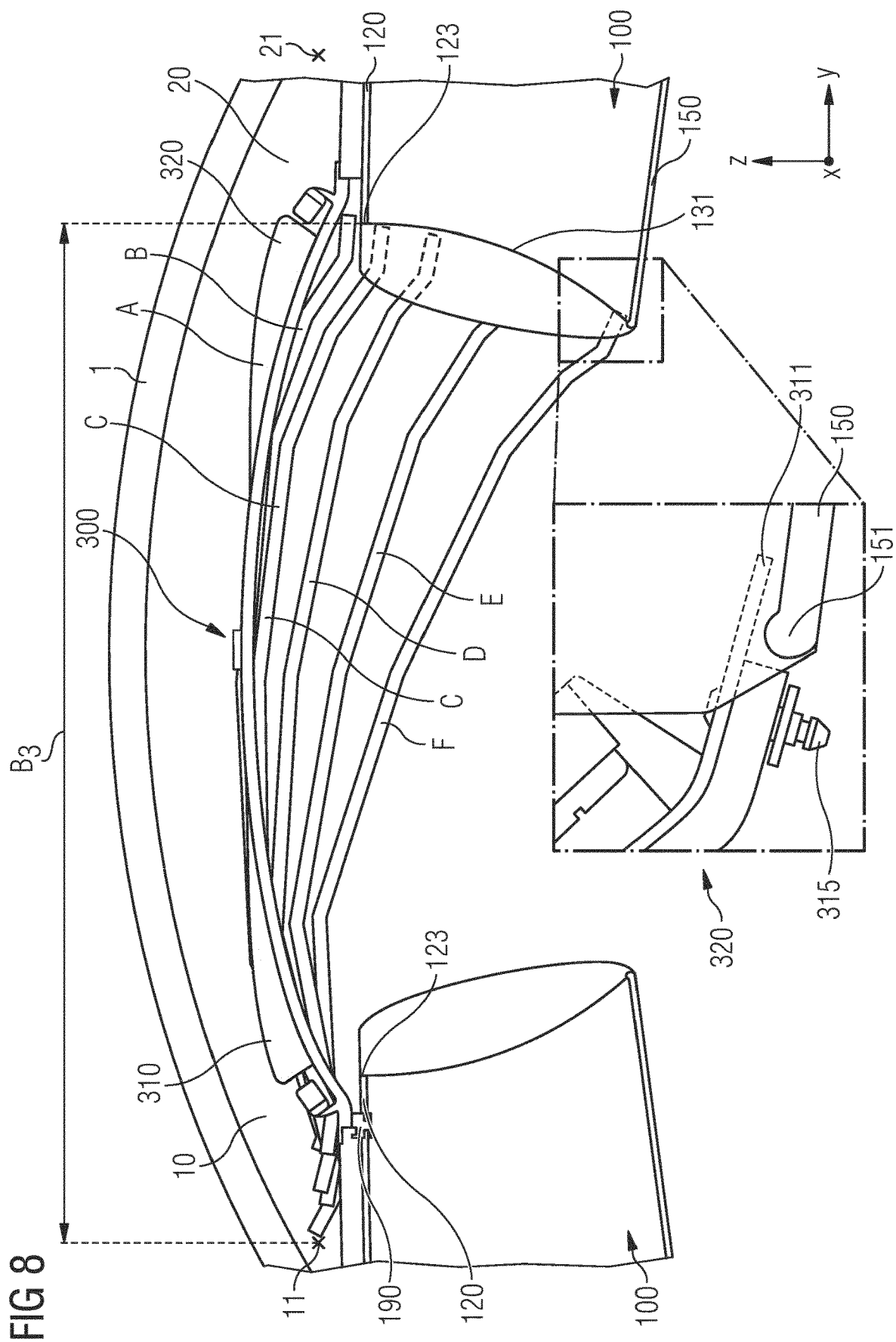
FIG. 8 shows schematically a cross section of a vehicle region with a sequence of positions during removal or installation of a ceiling panel.

FIG. 8 shows schematically a cross section of a vehicle region 2 having two luggage compartments 100 and a sequence of positions during removal or installation of a ceiling panel 300. At least one of the luggage compartments 100 can, for example, have a holding device 190, which is arranged on an upper side of the luggage compartment top 120 of the luggage compartment 100 and is designed for fastening a cover panel 300. The holding device 190 can have a positive and/or nonpositive connection means for fastening the ceiling panel 300. For example, the ceiling panel 300 can comprise a pin-shaped holding element 315, which can be inserted into a corresponding opening in the holding device 190 and held there by means of positive engagement and/or nonpositive engagement. As can be seen in FIG. 8, the holding device 190 is spaced apart from the front edge 123 of the luggage compartment top 120, in particular, spaced apart toward a rear side of the luggage compartment 100. This spacing results from the dimension of the ceiling panel 300, which was designed for conventional luggage compartments 50 (FIG. 1).

The removal of such a ceiling panel 300 will be described first. For example, the ceiling panel 300 can be arranged in position A, in which a holding element 315 on a first side 310 and a further holding element 315 on a second side 320, opposite the first side 310, of the ceiling panel 300 are each fixed in a holding device 190. The ceiling panel 300 can be moved to a limited extent by releasing it from the holding device 190, e.g., by lifting the ceiling panel 300. In this way, the first side 310 of the ceiling panel 300 can be introduced into a first intermediate space 10 between a primary structure 1 of the vehicle 1 and a first of the luggage compartments 100 (on the left in FIG. 8). The ceiling panel 300 can be moved to the left in the view according to FIG. 8.

For better handling and movement of the ceiling panel 300, a luggage compartment flap 110, which is already absent from the illustration in FIG. 8, can first be removed from the second luggage compartment 100 (on the right in FIG. 8). As a result, the element which extends furthest into the space of the passenger cabin in the upper region of the luggage compartment 100 is the front edge 123 of the luggage compartment top 120. In the example shown in FIG. 8, it is sufficient if the luggage compartment flap 110 of the second luggage compartment 100 is removed.

In this case, the first side 310 of the ceiling panel 300 can be moved into the first intermediate space 10 up to an end point 11. The end point 11 can be located, for example, on the primary structure 1 of the vehicle and/or on an upper side of the luggage compartment top 120 of the first luggage compartment 100 (on the left in FIG. 8) and/or on a line 5 (see FIG. 1), which is arranged in the first intermediate space 10. In this position, the ceiling panel 300 cannot be moved further (to the left in FIG. 8).

The second side 320 of the ceiling panel 300 can now be lowered, wherein the second side 320 is guided past a front edge 123 of a luggage compartment top 120 of the second luggage compartment 100 (positions B and C) and is guided at least partially through the luggage space 101 of the second luggage compartment 100 (positions D and E). During this movement, the second side 320 of the ceiling panel 300 can be guided along the front edge 131 of the partition 130. In this case, the shape of the front edge 131 of the partition 130 is adapted as far as possible to the movement (for example rotary movement) of the ceiling panel 300. For example, a concave shape of the front edge 131 favors this movement of the ceiling panel 300.

Finally, as the second side 320 of the ceiling panel 300 is lowered further, the second side 320 can be guided past a front edge 151 of a luggage compartment bottom 150 of the second luggage compartment 100. At this moment, the first side 310 of the ceiling panel 300 is still in the intermediate space 20 above the first luggage compartment 100 (position F). Guiding the second side 320 of the ceiling panel 300 past the front edge 151 of the luggage compartment bottom 150 can include elastically deforming a terminal lip 311 of the ceiling panel 300. The terminal lip 311 can, for example, be attached in a projecting manner to the second side 320 of the ceiling panel 300 and be made of a flexible plastic or rubber.

The ceiling panel 300 can then be completely removed and taken out. Maintenance work can now be carried out in the intermediate spaces 10 and 20 and in the roof section 3 of the vehicle 1. Further ceiling panels adjoining ceiling panel 300 (in the direction of view of a longitudinal direction of the vehicle 1 (X axis)) can be removed in the same way. For this purpose, the adjacent ceiling panels 300 must be released from the respective holding device 190 and moved in the longitudinal direction of the vehicle 1 (X axis) to the position with the luggage compartment 100 with the luggage compartment flap 110 removed. As a result, a multiplicity of ceiling panels 300 can be removed step by step, while the luggage compartment flap 110 has to be removed from only a single luggage compartment 100. Furthermore, it would also be sufficient to provide this single luggage compartment 100 with a luggage compartment top 120 that permits the additional distance A from the upper edge 102 of the luggage space 101 to the front edge 123 of the luggage compartment top 120, while all the other luggage compartments can be configured in a conventional manner, but larger.

A ceiling panel 300 is installed in the reverse order, i.e., from position F to position A. A luggage compartment flap 110 can then be inserted and fastened on the first luggage compartment. In this case, it is possible, for example, to use the quick-release fastener 225 from FIG. 7.

With reference to FIG. 4, it can be seen that the side walls 140 may possibly hinder the installation or removal of a ceiling panel 300 if the ceiling panel 300 is at least as long as the luggage compartment 100 in the longitudinal direction of the vehicle 1 (X axis). Although ceiling panels 300 that are shorter in the longitudinal direction of the vehicle 1 could be used, a ceiling panel 300 having at least the length of a luggage compartment 100 is desirable for an attractive appearance. For example, joints between ceiling panels 300 may coincide with joints between luggage compartments 100 in the longitudinal direction of the vehicle 1, resulting in a uniform image.

In order then to remove a ceiling panel 300 of (almost) the same length, this can be rotated about a vertical axis (Z axis) in position B or C (FIG. 8). Optionally, the ceiling panel 300 can also be rotated about the transverse axis (Y axis). A corner of one side 320 of the ceiling panel 300 can now be guided into the luggage space 101 next to the side wall 140, while the corner of the same side 320 of the ceiling panel 300 which is opposite in the longitudinal direction of the vehicle 1 (X axis) is located outside the luggage space 101

(in the region in front of the other side wall 140). The sequence of the movement in FIG. 8 can likewise be carried out in this oblique position.

The detail in FIG. 8 indicates, likewise schematically, that the front edge 151 of the luggage compartment bottom 150 is set back (set back to the right in FIG. 8). The schematically indicated boundary of the luggage space 101, which runs obliquely upward to the left, overlaps with the second side 320 of the ceiling panel 300 in position F. If the front edge 151 of the luggage compartment bottom 150 were arranged further forward in a manner corresponding to the luggage space 101, it would not be possible to remove or install the ceiling panel 300. As can be seen in FIG. 8, the front edge 151 of the luggage compartment bottom 150 is located at a distance from the first end point 11 in the first intermediate space 10, this distance being greater than or equal to the width B1 of the ceiling panel 300.

The installation or removal of the ceiling panel 300 can also take place in a mirror-inverted manner, the ceiling panel 300 being moved with its second side 320 into the second intermediate space 20 to the second end point 21 and then the first side 310 of the ceiling panel 300 being lowered in front of the first luggage compartment 100 (on the left in FIG. 8).

Figure 9:
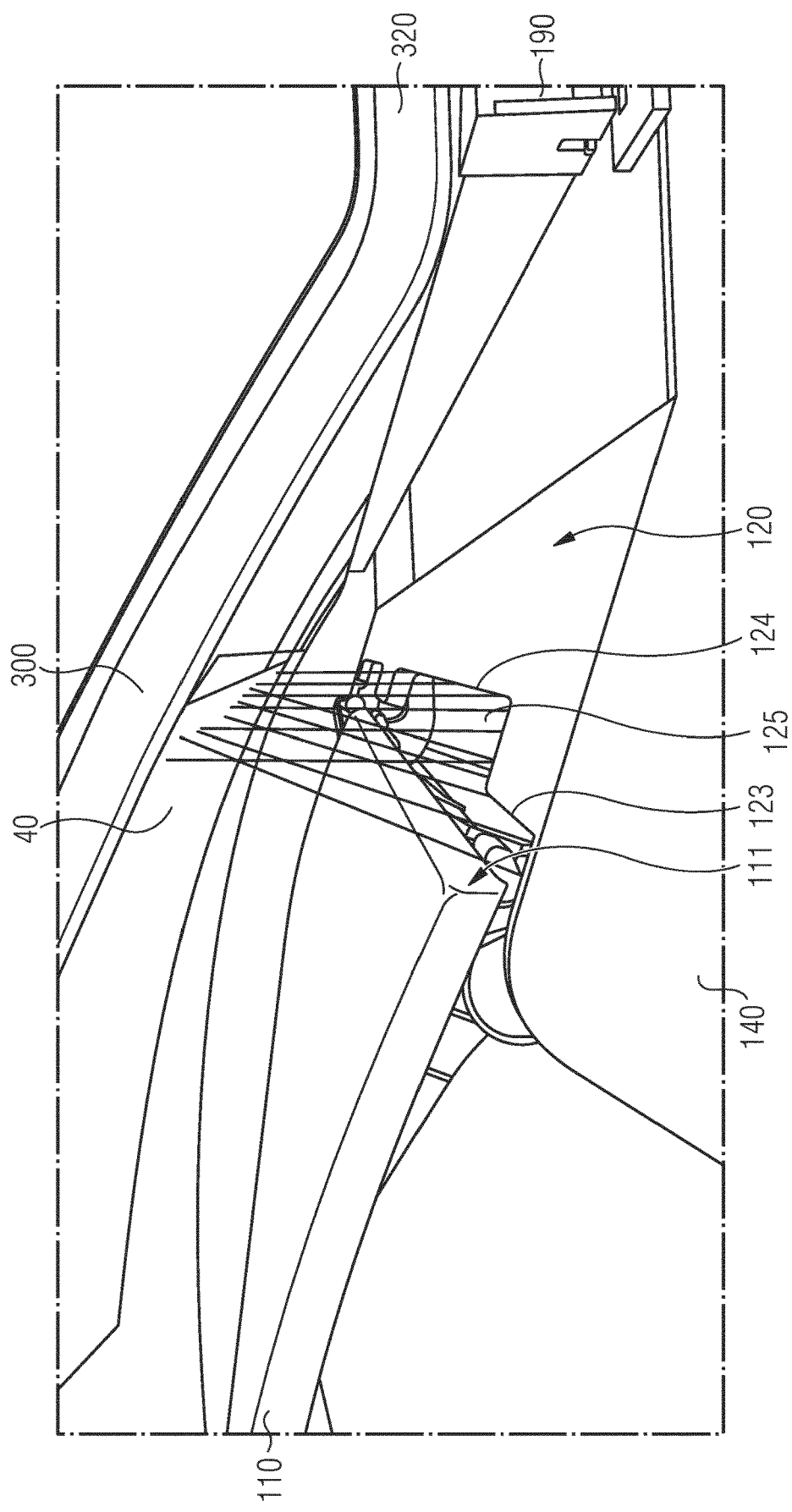
FIG. 9 shows schematically a perspective view of a light gap along a luggage compartment top of a luggage compartment.

FIG. 9 shows schematically a perspective view of a light gap 125 in a luggage compartment top 120 of a luggage compartment 100. Lighting 40 can be provided on or in a ceiling panel 300, for example. In particular, this may be conventional lighting 40 of a conventional ceiling panel 300. Owing to the larger luggage compartment 100, the lighting 40 would be covered by the luggage compartment top 120 of the luggage compartment 100, impairing lighting within the passenger cabin. Particularly when the luggage compartment flap 110 is open, which is also larger in the case of the larger luggage compartment 100, the conventional lighting 40 would be very much concealed. As illustrated in FIG. 9, the front edge 123 of the luggage compartment top 120 can now be recessed in at least one section 124 and can be spaced apart there by a second distance, which is greater than the first distance A, from the upper edge 111 of the luggage compartment flap 110. The light gap 125 which is formed in this case makes it possible to illuminate the passenger cabin since light of the lighting 40 can fall through the light gap into the passenger cabin and also partially into the luggage space 101.

Figure 10A:
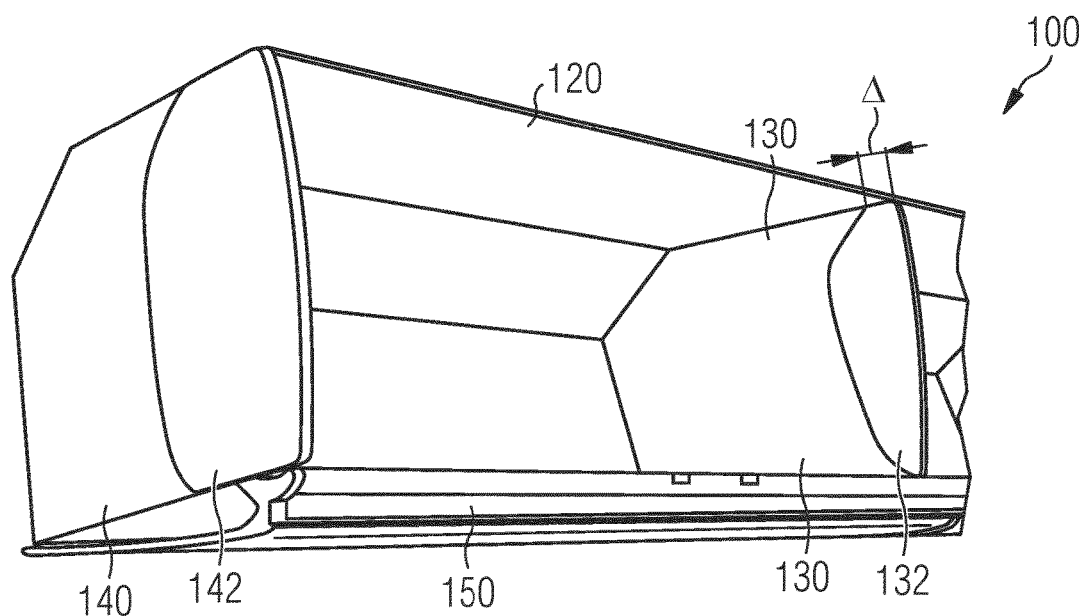
FIGS. 10A and 10B show schematically perspective views of a luggage compartment during removal of sections of a side wall and a partition of the luggage compartment.
Figure 10B:
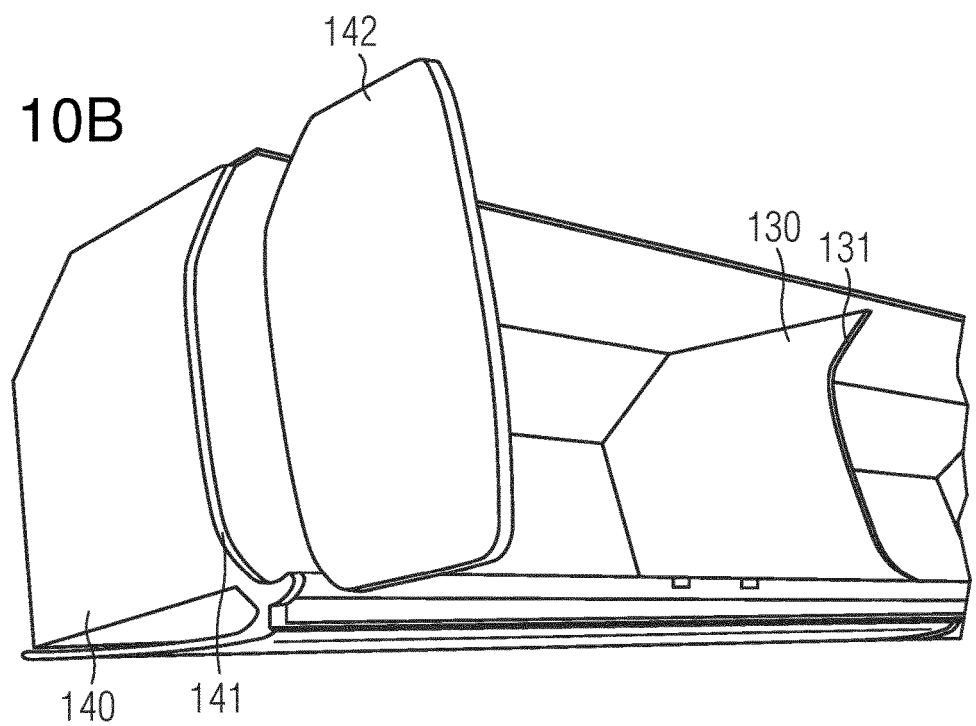

FIG. 10 shows schematically perspective views of a luggage compartment 100 with optional variants of the side wall 140 and of the partition 130. Thus, the partition 130 can comprise two sections, wherein a section 132 facing the luggage compartment flap 110 is fastened detachably on the luggage compartment 100. The section 132 can be inserted into the partition 130 and/or into the luggage compartment top 120 and/or into the luggage compartment bottom 150, for example. After removal of the section 132, the (concave) front edge 131 of the partition 130 is exposed, enabling the ceiling panel 300 to be installed and removed easily. The section 132 thus closes the lens-shaped opening between the partition 130 and the luggage compartment flap 110, thus ensuring that no objects can fall through or obstruct the luggage compartment flap 110.

Correspondingly, at least one of the side walls 140 of a luggage compartment 100 can also have a corresponding section 142 which faces the luggage compartment flap 110 and is fastened detachably on the luggage compartment 100. This section 142 too can be inserted into the side wall 140 and/or into the luggage compartment top 120 and/or into the luggage compartment bottom 150, and removed again. This makes it possible to expose a front edge 141 of the side wall 140 with a likewise concave shape, which can correspond, for example, to the concave shape of the front edge 131 of the partition 130. It is thereby possible to reduce luggage compartments 100 to such an extent that it is even possible to install and remove ceiling panels 300 which extend over more than one luggage compartment 100 in the longitudinal direction of the vehicle 1 (X axis).

FIGS. 11A and 11B show schematically a perspective view of a luggage compartment 100 with a removable partition 130 and a sequence of positions during the installation or removal of a ceiling panel 300. In this optional variant of the luggage compartment 100, the complete removable partition 130 can be removed. Rails or rail-like elements, into which the removable partition 130 can be pushed and correspondingly removed, can be arranged on the luggage compartment top 120 and the luggage compartment bottom 150 of the luggage compartment 100, for example.

As a result, the entire luggage space 101 of the luggage compartment 100 is free and can be used for installing and removing a ceiling panel 300. For example, as the second side 320 of the ceiling panel 300 (position B, as already explained in FIG. 8) is lowered, the second side 320 of the ceiling panel 300 can be introduced into the luggage space 101 of the second luggage compartment 100 (the right-hand luggage compartment in FIG. 11). Position C1 from FIG. 8 is illustrated for comparison, and position C2, adopted in the variant under consideration, is illustrated schematically. The ceiling panel 300 can now be moved further into the luggage space 101 of the second luggage compartment 100 (position D).

The opposite first side 310 of the ceiling panel 300 has now been removed from the first intermediate space 10, thus allowing the first side 310 of the ceiling panel 300 to be lowered and guided past a front edge 123 of the luggage compartment top 120 of the first luggage compartment 100. During this process, the first side 310 of the ceiling panel 300 can be guided at least partially through the luggage space 101 of the first luggage compartment 100 until position E is reached. The second side 320 of the ceiling panel 300 can then be guided out of the luggage space 101 of the second luggage compartment 100 (right-hand side in FIG. 11). The ceiling panel 300 can now be taken out completely.

The ceiling panel 300 is installed in the reverse order, with the partition 130 and the luggage compartment flap 110 then being reattached to the luggage compartment 100.

FIGS. 12 and 13 show flowcharts for methods of installing or removing a ceiling panel.

The installation of a ceiling panel 300 in a vehicle region 2, partly above two luggage compartments 100, first of all comprises introducing 501 a first side 310 of the ceiling panel 300 into a first intermediate space 10 between a primary structure of the vehicle 1 and a first of the luggage compartments 100 (the left-hand luggage compartment in FIGS. 1, 8 and 11, for example). Lifting 502 of a second side 320 of the ceiling panel 300, which is opposite the first side 310, can then take place, wherein the second side 320 of the ceiling panel 300 is guided at least partially through a luggage space 101 of a second one of the luggage compartments 100 and is guided past a front edge 123 of a luggage compartment top 120 of the second luggage compartment 100. After this, the method comprises moving 503 the ceiling panel 300 with its second side 320 into a second intermediate space 20 between the primary structure of the vehicle 1 and the second of the luggage compartments 100. Finally, fastening 504 of the first side 310 of the ceiling panel 300 on a holding device 190 on an upper side of the luggage compartment top 120 of the first luggage compartment 100 and fastening of the second side 320 of the ceiling panel 300 on a holding device 190 on an upper side of the luggage compartment top 120 of the second luggage compartment 100 can take place.

As an option, a partition 130 can be removed from the second luggage compartment 100 in a step 401, before the introduction 501 of the first side 310 of the ceiling panel 300. This allows likewise optional introduction 402 of the second side 320 of the ceiling panel 300 into the luggage space 101 of the second luggage compartment 100. A corresponding position of the ceiling panel 300 is shown in FIG. 11, positions C2, D and E.

In the corresponding reverse order, a method for removing a ceiling panel 300 which is arranged above two luggage compartments 100 in a vehicle 1 can comprise removing 601 a luggage compartment flap 110 from at least one of the second luggage compartments 100, releasing 602 one fastening each of the ceiling panel 300 from a respective holding device 190 on the two luggage compartments 100, and moving 603 the ceiling panel 300, wherein a first side 310 of the ceiling panel 300 is arranged in a first intermediate space 10 between a primary structure of the vehicle 1 and a first of the two luggage compartments 100. The ceiling panel can then optionally be rotated (step 624), e.g., about a vertical (Z axis).

The method then comprises lowering 604 a second side 320 of the ceiling panel 300, which is opposite the first side 310, wherein the second side 320 of the ceiling panel 300 is guided past a front edge 123 of a luggage compartment top 120 of a second of the two luggage compartments 100 and is guided at least partially through a luggage space 101 of the second luggage compartment 100, and removing 605 the ceiling panel 300 from the first intermediate space 10.

The exemplary embodiments and variants described above serve only to illustrate the invention. All examples, variants and individual details can be combined with one another as desired in order to form specific embodiments of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A region of a vehicle, comprising:
a roof section of a primary structure of the vehicle;
a first luggage compartment, which is arranged below the roof section and delimits a first intermediate space between the primary structure and the first luggage compartment;
a second luggage compartment, which is arranged opposite the first luggage compartment and below the roof section; and
a ceiling panel, which is arranged below the roof section and comprises a first side, which is arranged above the first luggage compartment, and a second side, which is opposite the first side and is arranged above the second luggage compartment,
wherein the first intermediate space comprises an end point that is furthest away from the second luggage compartment and to which the first side of the ceiling panel can be moved,
wherein the second luggage compartment comprises a detachable luggage compartment flap and a luggage compartment top, which forms an upper boundary of a part of a luggage space of the luggage compartment,
wherein a width of the ceiling panel, which extends from the first side to the second side of the ceiling panel, is greater than a distance between the end point and an upper edge of the luggage space of the second luggage compartment,
wherein the upper edge faces the roof section and the first luggage compartment, and
wherein the luggage compartment top is configured such that a front edge, facing the first luggage compartment, of the luggage compartment top is at a distance from the end point that is greater than or equal to the width of the ceiling panel.

2. The vehicle region as claimed in claim 1,
wherein the second luggage compartment comprises a fastening device, which is configured to rotatably fasten the luggage compartment flap on the luggage compartment, and
wherein an upper edge of the luggage compartment flap is spaced apart by a first distance from a front edge, facing the luggage compartment flap, of the luggage compartment top.

3. The vehicle region as claimed in claim 2,
wherein the front edge of the luggage compartment top of the second luggage compartment is recessed in at least one section and is spaced apart there by a second distance from the upper edge of the luggage compartment flap, and
wherein the second distance is greater than the first distance.

4. A method for installing a ceiling panel of a vehicle region in a vehicle, wherein the method comprises: providing a vehicle as claimed in claim 2;
introducing the first side of the ceiling panel into the first intermediate space between the primary structure of the vehicle and the first luggage compartment;
lifting the second side of the ceiling panel, which is opposite the first side, wherein the second side of the ceiling panel is guided at least partially through the luggage space of the second luggage compartment and is guided past the front edge of the luggage compartment top of the second luggage compartment;
moving the ceiling panel with its second side into a second intermediate space between the primary structure of the vehicle and the second luggage compartment; and
fastening the first side of the ceiling panel on a holding device on an upper side of the luggage compartment top of the first luggage compartment and fastening the second side of the ceiling panel on a holding device on an upper side of the luggage compartment top of the second luggage compartment.

5. The method as claimed in claim 4, further comprising at least one of:

inserting and fastening a luggage compartment flap on the first luggage compartment; or inserting and fastening a luggage compartment flap on the second luggage compartment.

6. The method as claimed in claim 4, further comprising, before introducing the first side of the ceiling panel:

removing a partition from the second luggage compartment; and introducing the second side of the ceiling panel into the luggage space of the second luggage compartment.

7. The vehicle region as claimed in claim 1, wherein the second luggage compartment comprises a fastening device, which is configured to rotatably fasten the luggage compartment flap on the luggage compartment, and wherein the fastening device comprises two sections, which are connected by a quick-release fastener, and wherein a section of the fastening device is completely covered by the luggage compartment top.

8. The vehicle region as claimed in claim 1, wherein the second luggage compartment further comprises:

a partition, which divides the luggage space and is arranged substantially perpendicular to the luggage compartment top and the luggage compartment flap, and wherein at least one of:

the partition has a concave front edge facing the luggage compartment flap, or the partition is fastened detachably on the luggage compartment.

9. The vehicle region as claimed in claim 8, wherein the second luggage compartment further comprises:

a side wall, which delimits the luggage space laterally in a longitudinal direction, and has a front edge, which faces the luggage compartment flap and has a shape corresponding to a cross section of the luggage compartment flap.

10. The vehicle region as claimed in claim 9, wherein at least one of the side wall or the partition comprises at least two sections, wherein at least one section facing the luggage compartment flap is fastened detachably on the luggage compartment.

11. A method for removing a ceiling panel of a vehicle region in a vehicle, wherein the method comprises: providing a vehicle as claimed in claim 1;

removing the luggage compartment flap of the second luggage compartment;

releasing one respective fastening of the ceiling panel from a respective holding device on the first and second luggage compartments;

moving the ceiling panel, wherein the first side of the ceiling panel is arranged in the first intermediate space between the primary structure of the vehicle and the first luggage compartment;

lowering the second side of the ceiling panel, which is opposite the first side, wherein the second side of the ceiling panel is guided past the front edge of the luggage compartment top of the second luggage compartment and is guided at least partially through the luggage space of the second luggage compartment; and removing the ceiling panel from the first intermediate space.

12. The method as claimed in claim 11, wherein lowering the second side of the ceiling panel further comprises guiding the second side of the ceiling panel past a front edge of a luggage compartment bottom of the second luggage compartment while the first side of the ceiling panel is still in the first intermediate space.

13. The method as claimed in claim 12, wherein guiding the second side of the ceiling panel past the front edge of the luggage compartment bottom includes elastically deforming a terminal lip projecting from the second side of the ceiling panel.

14. The method as claimed in claim 11, further comprising:

before lowering the second side of the ceiling panel, rotating the ceiling panel such that, as the second side of the ceiling panel is lowered, a corner of the ceiling panel, which is located on the second side, moves through the luggage space of the second luggage compartment.

15. The method as claimed in claim 11, wherein the second luggage compartment has a partition, which divides the luggage space of the second luggage compartment and has a front edge facing the luggage compartment flap, and wherein lowering the second side of the ceiling panel comprises moving the second side of the ceiling panel along the front edge of the partition.

16. The method as claimed in claim 11, wherein the second luggage compartment has a partition, which divides the luggage space of the second luggage compartment, and the method further comprises:

removing the partition from the second luggage compartment;

while lowering the second side of the ceiling panel, introducing the second side of the ceiling panel into the luggage space of the second luggage compartment;

lowering the first side of the ceiling panel, wherein the first side of the ceiling panel is guided past a front edge of a luggage compartment top of the first luggage compartment and is guided at least partially through a luggage space of the first luggage compartment; and guiding the second side of the ceiling panel out of the luggage space of the second luggage compartment.

* * * * *